(12) United States Patent
Mody et al.

(10) Patent No.: US 11,710,030 B2
(45) Date of Patent: Jul. 25, 2023

(54) FAULT DETECTABLE AND TOLERANT NEURAL NETWORK

(71) Applicant: TEXAS INSTRUMENTS INCORPORATED, Dallas, TX (US)

(72) Inventors: Mihir Narendra Mody, Bengaluru (IN); Prithvi Shankar Yeyyadi Anantha, Bengaluru (IN)

(73) Assignee: Texas Instmments Incorporated, Dallas, TX (US)

( * ) Notice: Subject to any disclaimer, the term of this patent is extended or adjusted under 35 U.S.C. 154(b) by 999 days.

(21) Appl. No.: 16/556,733

(22) Filed: Aug. 30, 2019

(65) Prior Publication Data

US 2020/0074287 A1 Mar. 5, 2020

(30) Foreign Application Priority Data

Aug. 31, 2018 (IN) .............................. 201841032677

(51) Int. Cl.
*G06N 3/063* (2023.01)
*G06N 3/04* (2023.01)
(Continued)

(52) U.S. Cl.
CPC ......... *G06N 3/063* (2013.01); *G06F 11/1004* (2013.01); *G06F 15/7807* (2013.01); *G06F 17/16* (2013.01); *G06N 3/048* (2023.01)

(58) Field of Classification Search
None
See application file for complete search history.

(56) References Cited

U.S. PATENT DOCUMENTS 11,023,320 B2 * 6/2021 Wu ....................... G06F 3/0619
11,204,826 B2 * 12/2021 Noguchi .............. G11C 29/025
(Continued)

FOREIGN PATENT DOCUMENTS

WO   WO-2022223881 A1 * 10/2022

OTHER PUBLICATIONS

Machine Translation of Chinese Patent Application CN 108733628 B, filed May 23, 2018. (Year: 2018).*
(Continued)

*Primary Examiner* — Steven G Snyder
(74) *Attorney, Agent, or Firm* — Michael T. Gabrik; Frank D. Cimino

(57) ABSTRACT

A hardware neural network engine which uses checksums of the matrices used to perform the neural network computations. For fault correction, expected checksums are compared with checksums computed from the matrix developed from the matrix operation. The expected checksums are developed from the prior stage of the matrix operations or from the prior stage of the matrix operations combined with the input matrices to a matrix operation. This use of checksums allows reading of the matrices from memory, the dot product of the matrices and the accumulation of the matrices to be fault corrected without triplication of the matrix operation hardware and extensive use of error correcting codes. The nonlinear stage of the neural network computation is done using triplicated nonlinear computational logic. Fault detection is done in a similar manner, with fewer checksums needed and correction logic removed as compared to the fault correction operation.

20 Claims, 20 Drawing Sheets

(51) Int. Cl.
  *G06F 15/78*  (2006.01)
  *G06F 11/10*  (2006.01)
  *G06F 17/16*  (2006.01)
  *G06N 3/048*  (2023.01)

(56) References Cited

U.S. PATENT DOCUMENTS

| | | | |
|---|---|---|---|
| 11,507,452 B1* | 11/2022 | Yoon | G06F 11/1004 |
| 2012/0221884 A1* | 8/2012 | Carter | G06F 11/0772 |
| | | | 714/2 |
| 2018/0365099 A1* | 12/2018 | Schwartz | G06F 9/5027 |
| 2019/0227871 A1* | 7/2019 | Wu | G06F 3/0673 |
| 2019/0272121 A1* | 9/2019 | Khan | G11C 11/54 |
| 2019/0303237 A1* | 10/2019 | Chauhan | G06F 11/1044 |
| 2019/0310911 A1* | 10/2019 | Sundaram | G06F 11/1048 |
| 2019/0317857 A1* | 10/2019 | Khan | G06F 11/1012 |
| 2020/0104205 A1* | 4/2020 | Noguchi | G11C 29/52 |

OTHER PUBLICATIONS

'Block-checksum-based Fault Tolerance for Matrix Multiplication on Large-Scale Parallel Systems' by Yanchao Zhu et al., 2018 IEEE 20th International Conference on High Performance Computing and Communications, Jun. 30, 2018. (Year: 2018).*
'FaultTolerant Matrix-Matrix Multiplication: Correcting Soft Errors On-Line' by Panruo Wu et al., Nov. 13, 2011. (Year: 2011).*
Yeyyadi Anantha, "Efficient Neural Network Inference Hardware Architecture for Safety Applications", Dissertation Work carried out at Texas Instruments India Pvt Ltd, Birla Institute of Tec.Hnology and Science, Pilani (Rajasthan) India, Aug. 2018.

* cited by examiner

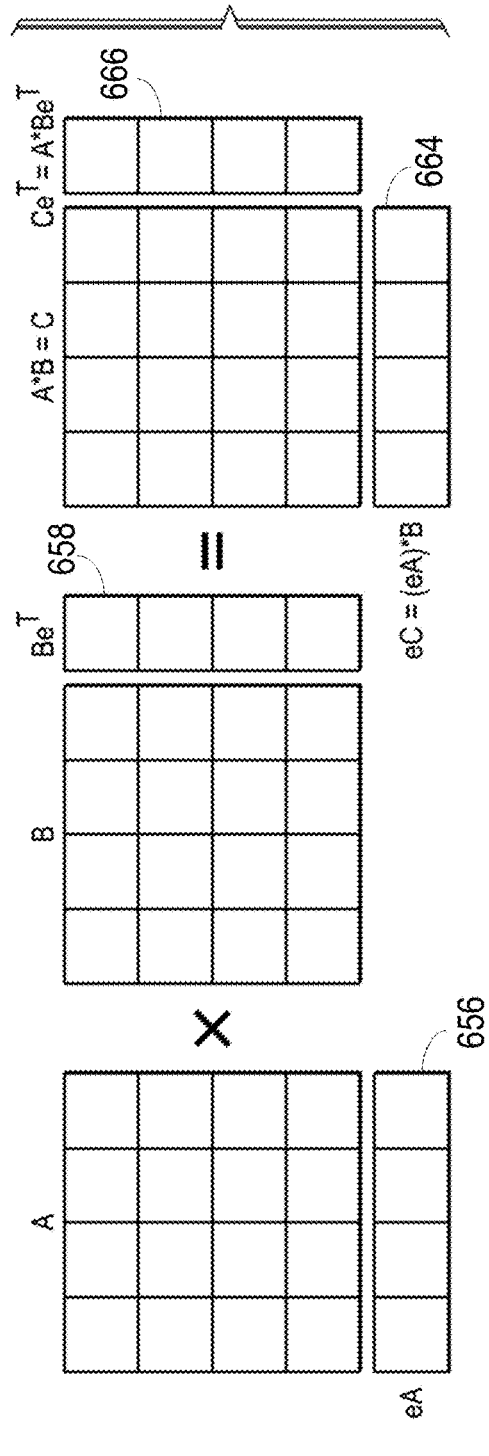
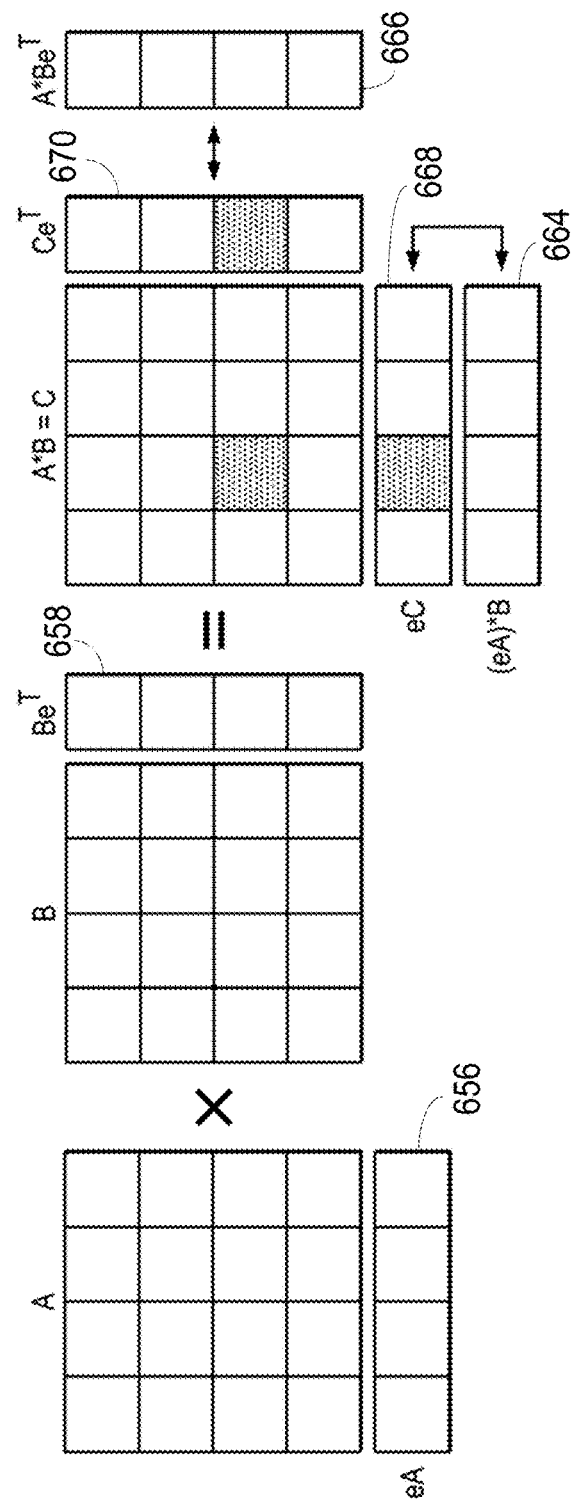

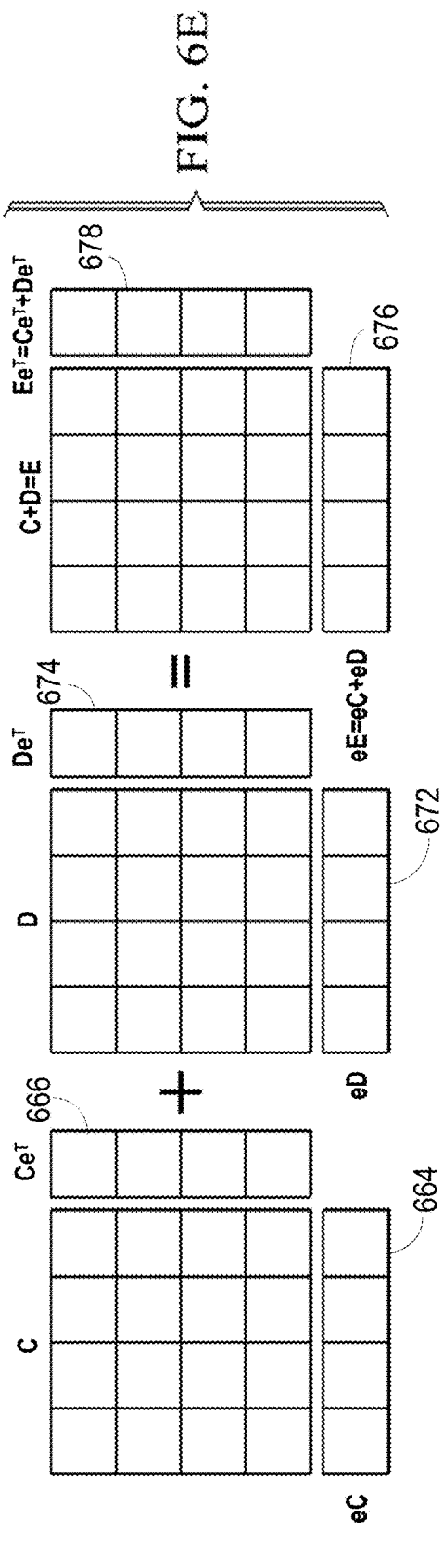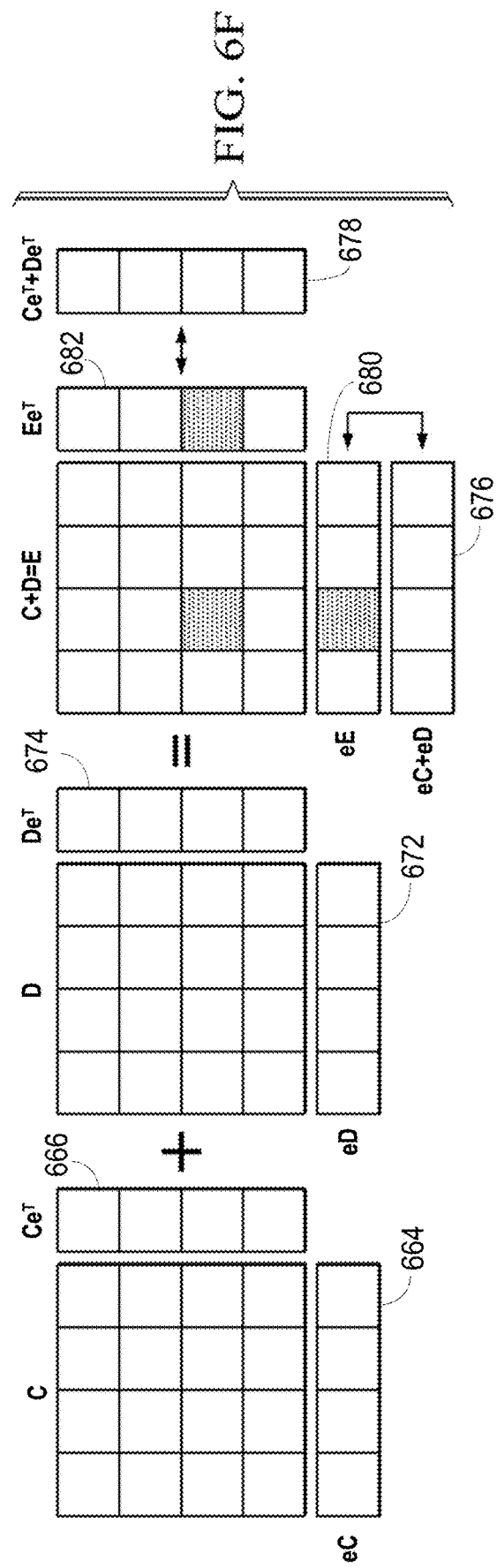

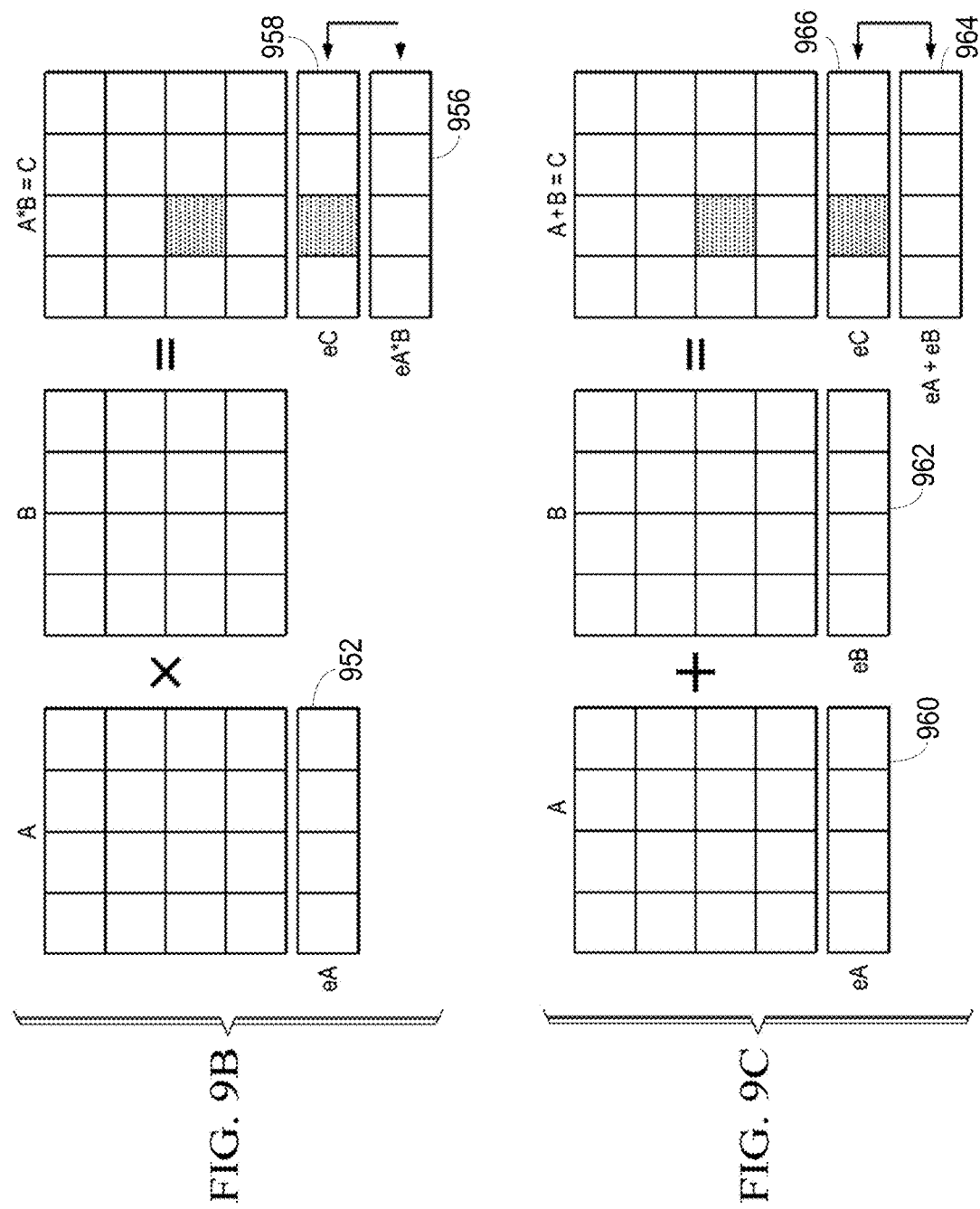
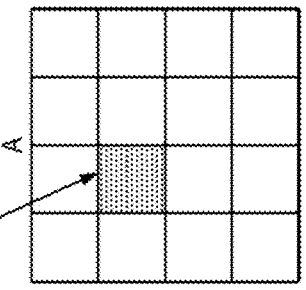
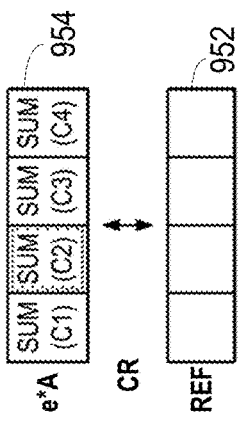
FIG. 9A
FIG. 9B
FIG. 9C

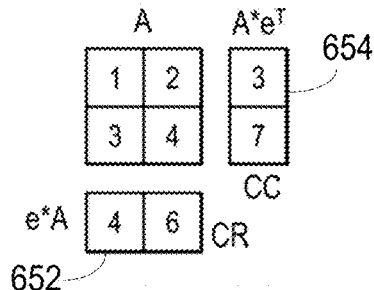
FIG. 12A
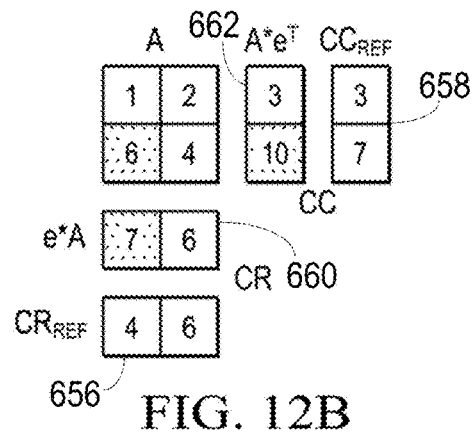
FIG. 12B
FIG. 12C
FIG. 12D
FIG. 12E
FIG. 12F

FIG. 12G

FIG. 12H

FAULT DETECTABLE AND TOLERANT NEURAL NETWORK

RELATED APPLICATIONS

This application claims priority to India Provisional Application No. 201841032677, filed Aug. 31, 2018, which is hereby incorporated by reference.

BACKGROUND

1. Field

The field relates to fault detection and correction in matrix operations.

2. Description of the Related Art

Electronics use in automobiles is increasing daily. In addition to the conventional engine controller, transmission controller, infotainment unit, body controller and the like, the advent of numerous safety and autonomous systems are greatly increasing the processing done inside an automobile. For example, adaptive cruise control may entail intercommunication between a radar system, an engine controller and a transmission controller. As another example, in a bird's eye view display, outputs from a number of different cameras arranged at various locations are provided to a processor to process the received video and develop the resultant bird's eye view image, which is then provided to the infotainment system for display to the driver. This increase in the number and type of input sensors places large burdens on the SoC devices that receive the sensor data. Additionally, the sensor data is often used by multiple processes, increasing the demands on the SoC devices. The burden is further complicated because of the reliability requirements for the safety systems that use the sensor data, which often require duplication, at least, of computational blocks.

SUMMARY

A neural network is often a key component in object detection and autonomous driving scenarios. To avoid having to duplicate or triplicate a hardware neural network engine for use in a neural network to provide the desired fault detection or correction for use in a vehicle, a hardware neural network engine uses checksums of the matrices used to perform the neural network computations. For fault correction, expected checksums are compared with checksums computed from the matrix developed from the matrix operation. The expected checksums are checksums developed from the prior stage of the matrix operations or checksums developed from the prior stage of the matrix operations combined with the input matrices to a matrix operation. This use of checksums allows reading of the matrices from memory, the dot product of the matrices and the accumulation of the matrices as needed for neural network computations to be fault corrected without triplication of the matrix operation hardware and extensive use of error correcting codes. The nonlinear stage of the neural network computation is done using triplicated nonlinear computational logic, but the overall area of the nonlinear stage remains small.

This use of checksums in matrix operations allows fault tolerant operation of a neural network engine in a much smaller silicon area than would be needed for conventional triplicated processing blocks.

Fault detection is done in a similar manner, with fewer checksums needed and correction logic removed as compared to the fault correction operation. This provides an even further savings of silicon area if only fault detection is needed.

BRIEF DESCRIPTION OF THE FIGURES

For a detailed description of various examples, reference will now be made to the accompanying drawings in which:

FIGS. 6A-6F are diagrams illustrating matrix operations used in the systolic neural network of FIG. 6.

FIGS. 9A-9C are diagrams illustrating matrix operations used in the systolic neural network of FIG. 9.

FIGS. 12A-12H are examples of the matrix operations of FIGS. 6A-6F and 9A-9C.

DETAILED DESCRIPTION

Figure 1:
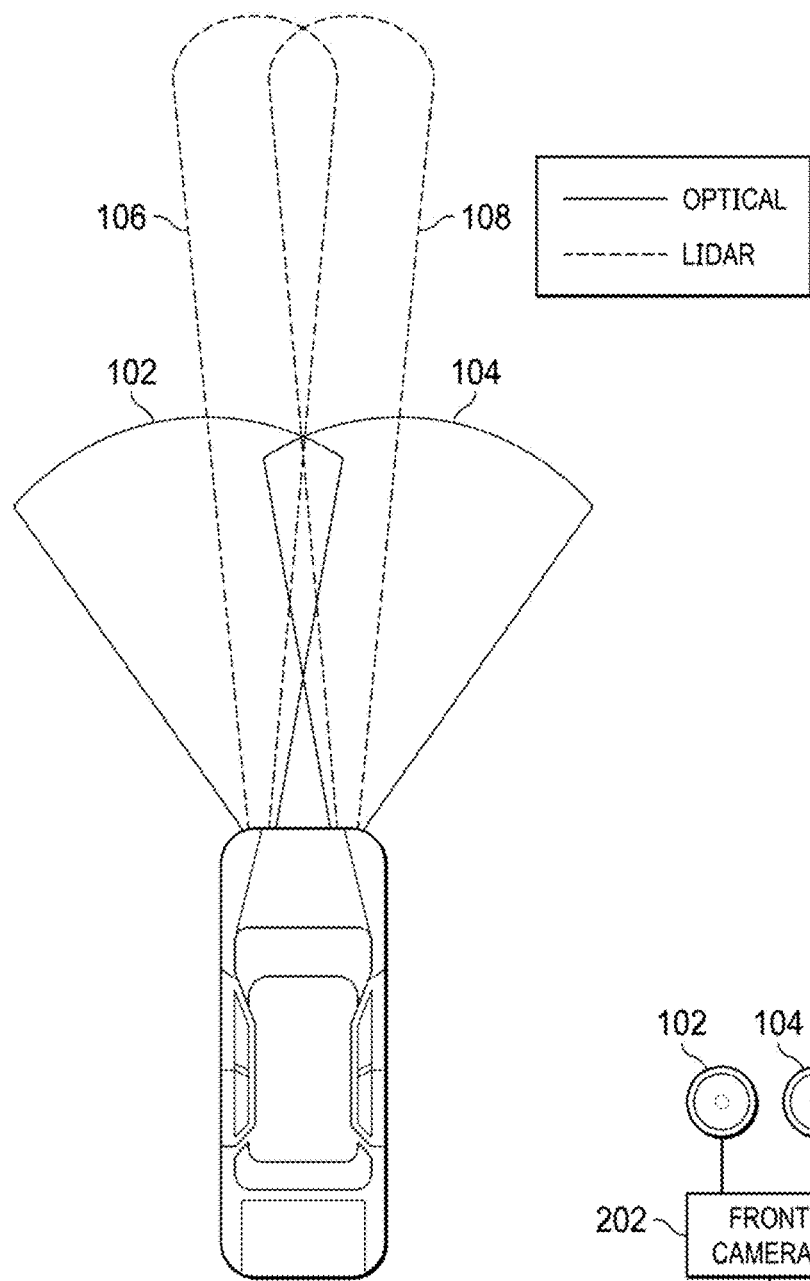
FIG. 1 is a drawing of a vehicle and the fields of view of various sensors.

Referring now to FIG. 1, a vehicle 100 is shown. The vehicle 100 includes a series of cameras or optical sensors. Left camera 102 and right camera 104 provide images from the front of the vehicle 100 for lane departure warnings, traffic sign recognition, collision alert and object detection. A left LIDAR (light detecting and ranging) sensor 106 and a right LIDAR sensor 108 provide images from the front of the vehicle 100 for lane and object detection. These camera and LIDAR sensors provide the inputs to various advanced driver assistance systems (ADAS). It is understood that cameras and LIDAR sensors are just examples and many other sensors, such as radar and ultrasonic and the like can be used as well.

Figure 2:
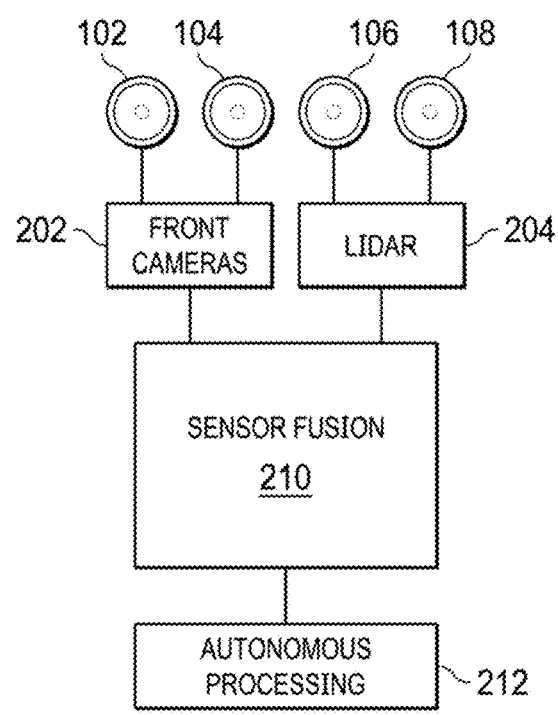
FIG. 2 is a block diagram of the sensors in the vehicle of FIG. 1.

Referring now to FIG. 2, cameras 102 and 104 are connected to a front cameras module 202. LIDAR sensors 106 and 108 are connected to a LIDAR module 204. The front cameras module 202 and the LIDAR module 204 are connected to a sensor fusion module 210 which integrates the various sensor outputs developed by the other modules. An autonomous processing module 212 is connected to the sensor fusion module 210 to perform autonomous processing needed for vehicle operation. It is understood that more or fewer sensors can be connected to a given module and multiple sensor types can be provided to a single module.

Figure 3:
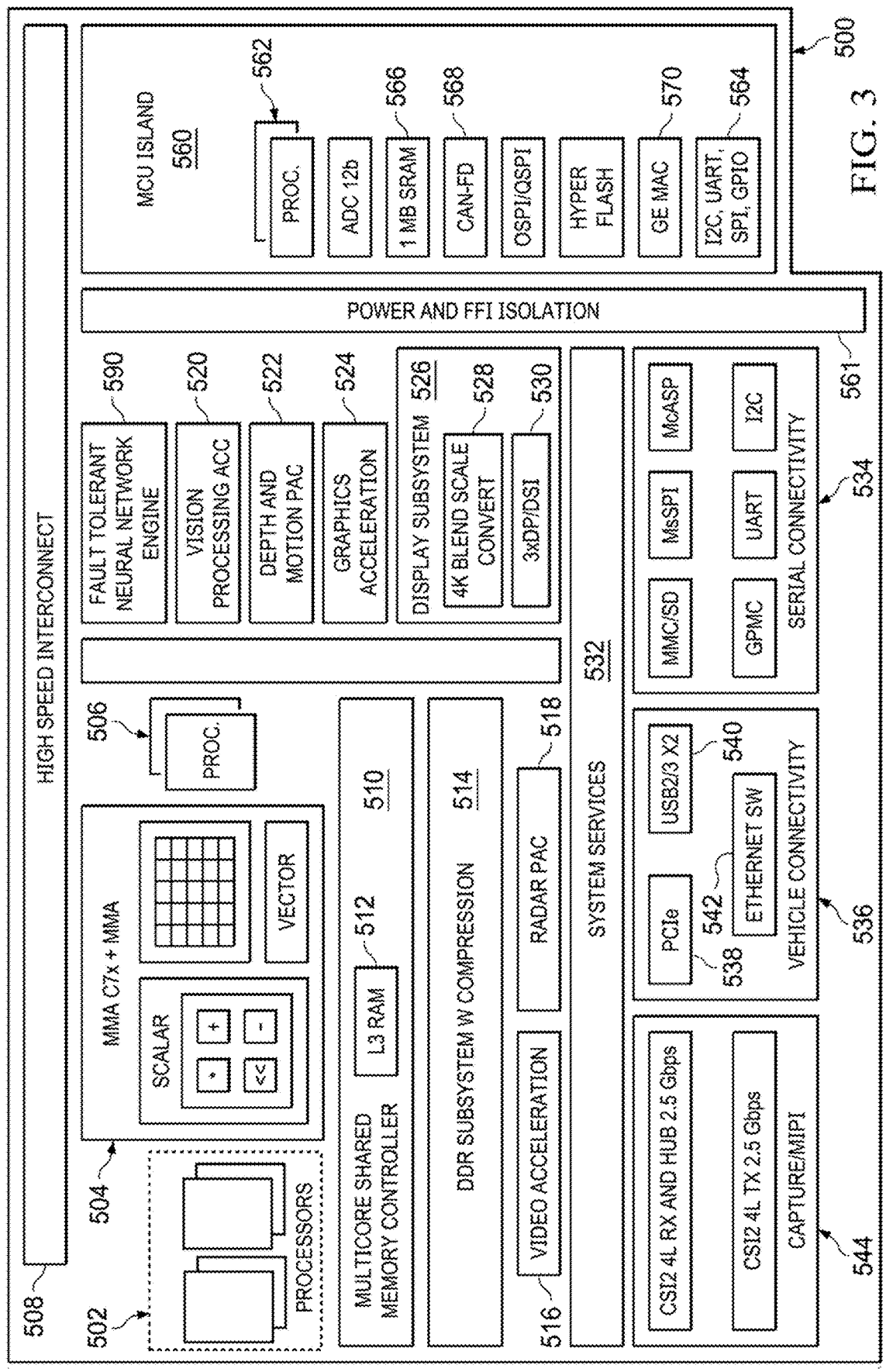
FIG. 3 is a block diagram of an SoC as used in the sensor modules of FIG. 2.

FIG. 3 is a block diagram of an exemplary SoC 500 as can be used in the modules 202, 204, 210 or 212. A series of more powerful microprocessors 502, such as ARM® A72 or A53 cores, form the primary general-purpose processing block of the SoC 500, while a digital signal processor (DSP) 504 provides specialized computing capabilities. A simpler microprocessor 506, such as an ARM R5F core, provides general control capability in the SoC 500. A high-speed interconnect 508 connects the microprocessors 502, DSP 504 and microprocessor 506 to various other components in the SoC 500. For example, a shared memory controller 510, which includes onboard memory or RAM 512, is connected to the high-speed interconnect 508 to act as the onboard RAM for the SoC 500. A DDR memory controller system 514 is connected to the high-speed interconnect 508 and acts as an external memory interface to external DRAM memory. A video acceleration module 516 and a radar processing accelerator (PAC) module 518 are similarly connected to the high-speed interconnect 508. A vision processing accelerator module 520 is connected to the high-speed interconnect 508, as is a depth and motion PAC module 522. A graphics acceleration module 524 is connected to the high-speed interconnect 508. A display subsystem 526 is connected to the high-speed interconnect 508 and includes conversion logic 528 and output logic 530 to allow operation with and connection to various video monitors if appropriate. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as normal in an SoC. A vehicle connectivity module 536 provides interconnects for external communication interfaces, such as PCIe block 538, USB block 540 and an Ethernet switch 542. A capture/MIPI module 544 includes a four-lane CSI-2 compliant transmit block 546 and a four-lane CSI-2 receive module and hub. Further details on the CSI-2 receive module and hub are provided below.

An MCU island 560 is provided as a secondary subsystem and handles operation of the integrated SoC 500 when the other components are powered down to save energy. A processor 562, such as one or more ARM R5F cores, operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568, an additional external communication interface, is connected to allow operation with a conventional CAN bus environment in the vehicle 100. An Ethernet MAC (media access control) block 570 is provided for further connectivity in the vehicle 100. Nonvolatile memory (NVM) is connected to the MCU ARM processor 562. The MCU ARM processor 562 operates as a safety processor, monitoring operations of the SoC 500 to ensure proper operation of the SoC 500.

A fault tolerant hardware neural network engine 590 is connected to the high-speed interconnect 508 to provide neural network computations in a manner not requiring duplicating or trebling the components used to provide the neural network computations. The fault tolerant hardware neural network engine 590 is discussed in more detail below.

It is understood that this is one example of an SoC provided for explanation and many other SoC examples are possible, with varying numbers of processors, DSPs, accelerators and the like.

Figures 4A, 4B:
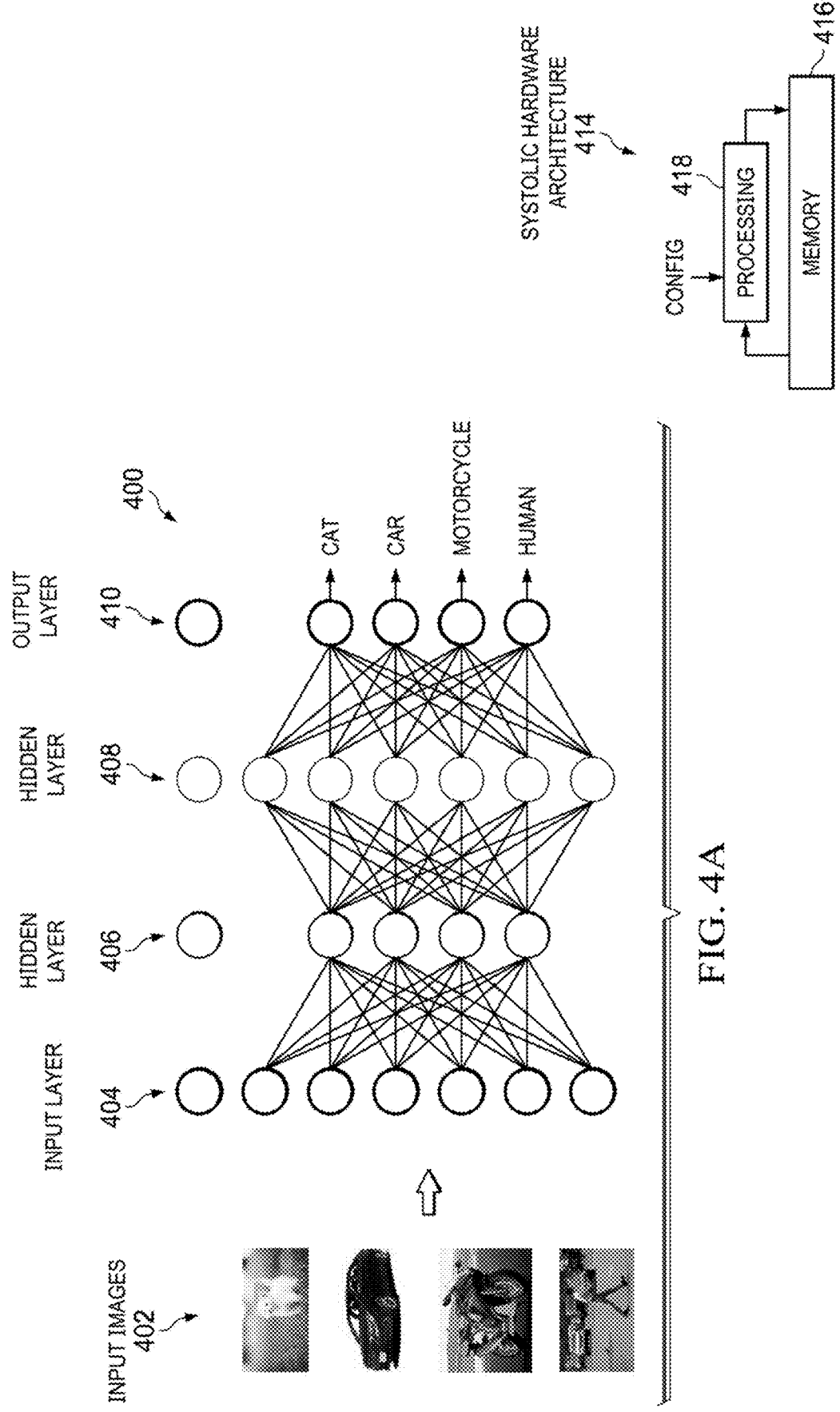
FIG. 4A is a block diagram of a neural network.
FIG. 4B is a block diagram of a systolic hardware architecture utilizing a single processing element.

Collision alert, lane departure, autonomous driving, and other driver assistance features may utilize object detection. A neural network 400, as illustrated in FIG. 4A, is a type of processing architecture that may be used for classifying objects. An image 402 is provided to the neural network 400. In the illustrated four-layer neural network 400, the network includes a first layer that is an input layer 404. The input layer 404 is connected to a first hidden layer 406. The neurons of the input layer 404 receive some or all of the image 402, perform processing on their respective portions of the image 402, and provide their results to some or all of the neurons in the first hidden layer 406. The first hidden layer 406 is hidden because its neurons neither receive an initial input of the neural network 400 nor provide a final output of the neural network 400. In this example, the neurons of the first hidden layer 406 are connected to neurons of a second hidden layer 408. Accordingly, the neurons of the first hidden layer 406 perform processing on the results received from the neurons of the input layer 404 and provide results to some or all of the neurons in the second hidden layer 408. Similarly, the neurons of the second hidden layer 408 are coupled to neurons of an output layer 410, and each neuron in the second hidden layer 408 provides a result to some or all of the neurons in the output layer 410. In some examples, the output layer 410 is a classification layer. In an object detection and classification application, the output of the output layer 410 is an indication of a detected object.

Figure 4C:
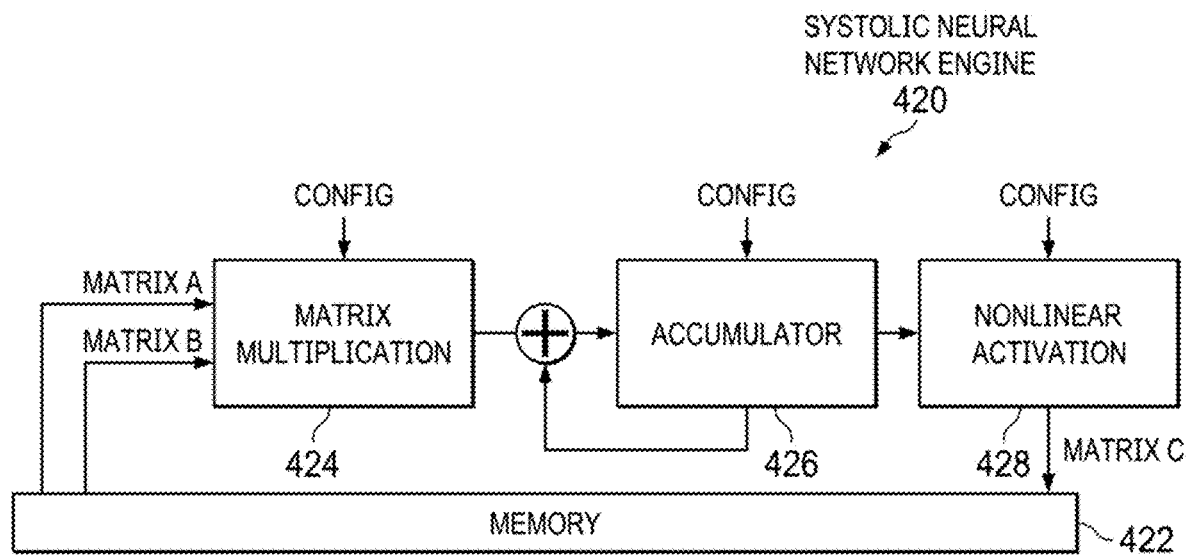
FIG. 4C is a block diagram of a systolic neural network engine example of the systolic hardware architecture of FIG. 4B.

A neural network is often implemented in a systolic hardware architecture 414 as shown in FIG. 4B in a highly generalized format with just memory 416 and processing block 418. In practice, artificial neural network operations may be computed by performing matrix operations on the inputs to simulate the neurons in the various layers and produce the outputs. FIG. 4C provides an example of the generic systolic hardware architecture 414 configured as a systolic neural network engine 420 that utilizes matrix operations. A memory 422 stores the matrix-format data used in the computations, in the illustrated case, matrices A and B. A matrix multiplier 424 multiplies matrices A and B. The result of the multiplication is accumulated in an accumulator 426. A nonlinear activation block 428 operates on the accumulated matrix and provides an output matrix C to the memory 422.

In automotive applications, safety is a priority in many of the electrical systems. ISO 26262 defined various Automotive Safety Integrity Levels (ASIL). The ASIL level needed for a given system is based on severity, probability of exposure, and controllability. Probability of exposure has five classes: "Incredible" to "High probability" (E0-E4). Severity has four classes: "No injuries" to "Life-threatening injuries (survival uncertain), fatal injuries" (S0-S3). Controllability, which means controllability by the driver, not by the vehicle electronic systems, has four classes: "Controllable in general" to "Difficult to control or uncontrollable."

These values are combined to produce an ASIL level from A to D, A being the lowest level and D being the highest level.

Figure 5A:
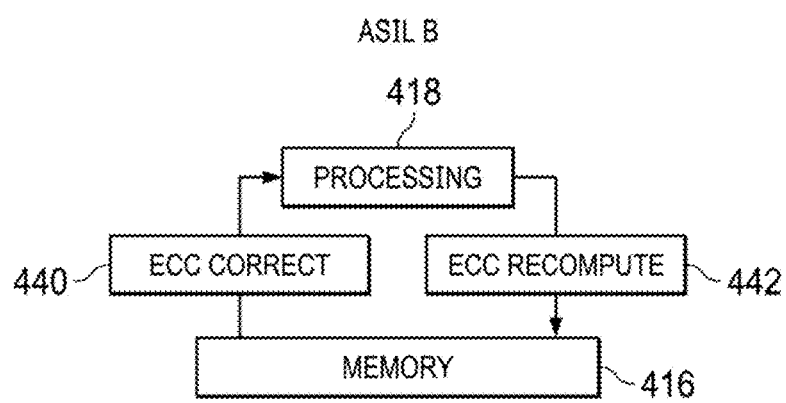
FIG. 5A is a block diagram of the systolic hardware of FIG. 4B configured for ASIL B operation.
Figure 5B:
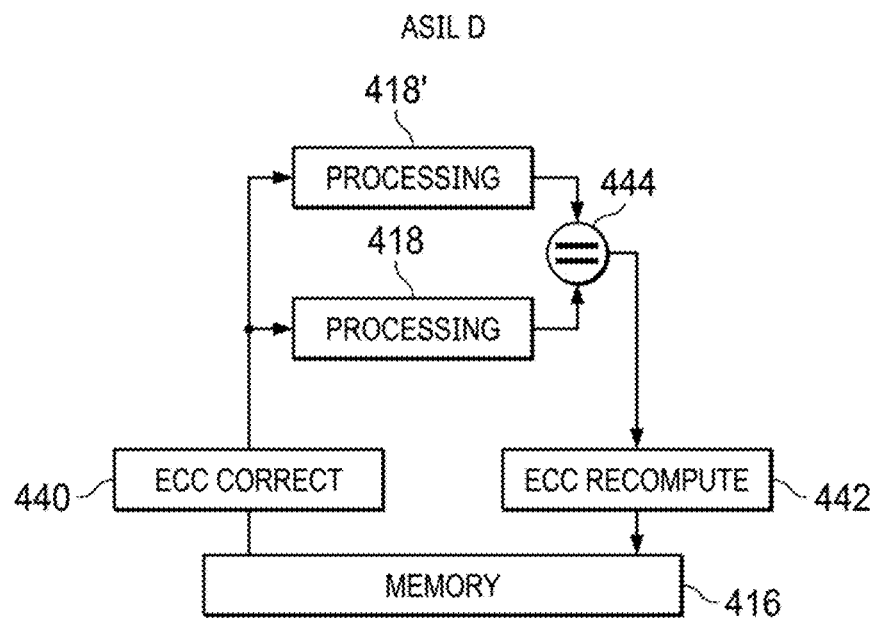
FIG. 5B is a block diagram of the systolic hardware of FIG. 4B configured for ASIL D operation.
Figure 5C:
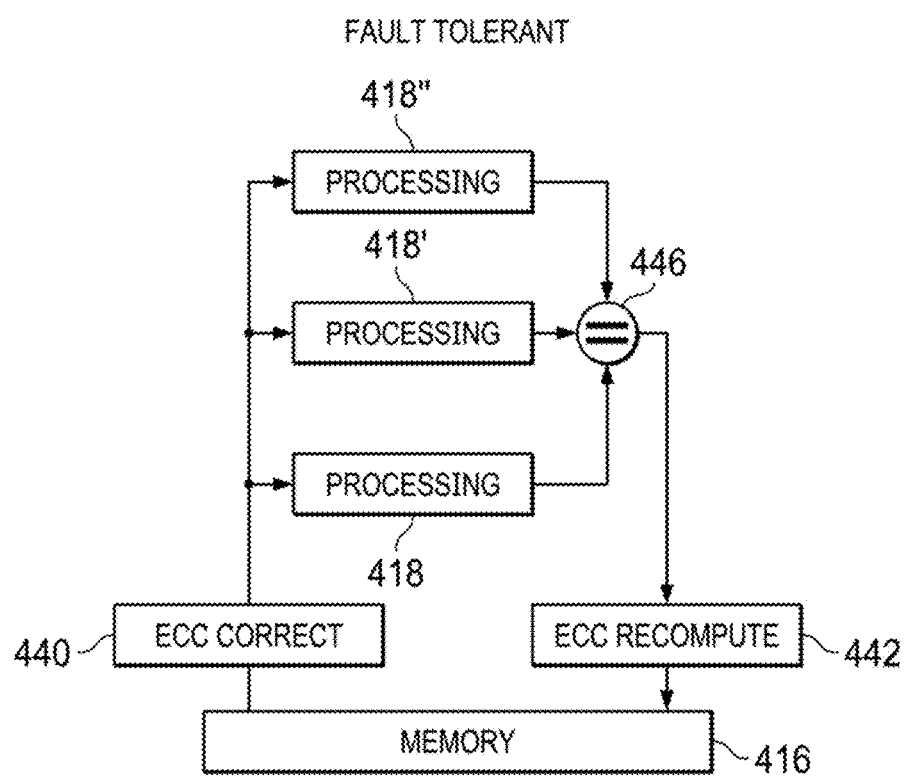
FIG. 5C is a block diagram of the systolic hardware of FIG. 4B configured for fault tolerant operation.

FIG. 5A illustrates the systolic hardware architecture 414 modified for ASIL B operation by the inclusion of error correcting codes (ECC) in the memory 416 and the addition of an ECC correction block 440 and an ECC recompute block 442. FIG. 5B is the systolic hardware architecture 414 modified for ASIL D operation by the addition of a second processing block 418' and comparator logic 444. The processing block 418 and second processing block 418' may operate synchronously (i.e., in lockstep) to simplify the comparison operation. Finally, FIG. 5C illustrates fault tolerant operation, which is above ASIL D, but considered appropriate in many cases when autonomous operation is being considered. An additional processing block 418" is added and the comparator logic 444 is changed to voting logic 446.

When viewed from a silicon area viewpoint, each of the ASIL B and D levels and fault tolerance require increasing amounts of silicon. If the memory is 64 bits wide, an additional 8 bits, or 12.5%, are required for ECC operation. Having two identical processors operating in lockstep effectively doubles the amount of silicon used by the processing block. Fault tolerance takes the processing block silicon area even higher.

Figure 6:
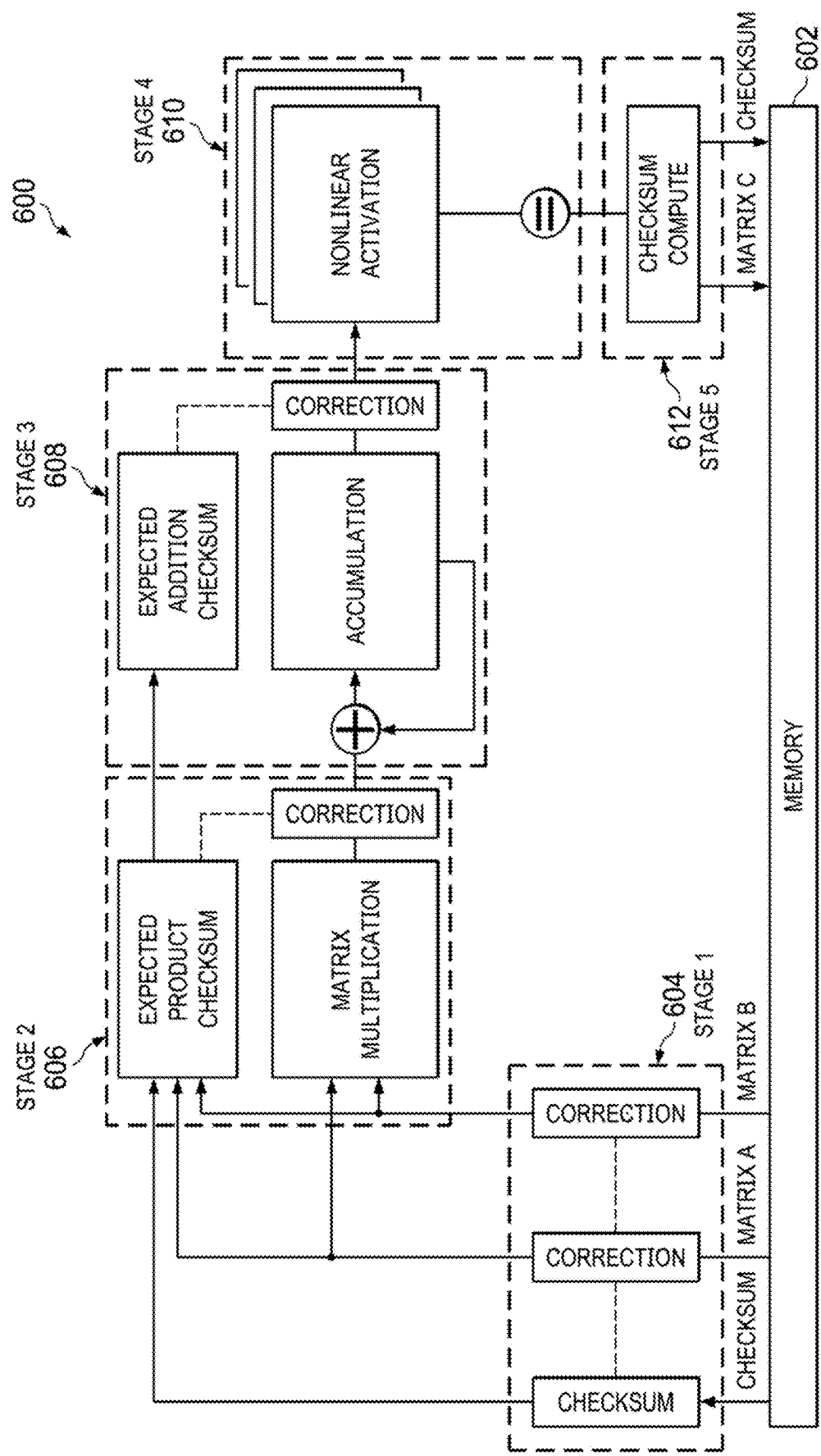
FIG. 6 is a block diagram of a systolic neural network configured for fault tolerant operation.

One example of a fault tolerant hardware neural network engine 600 is provided in FIG. 6. The fault tolerant hardware neural network engine 600 is based on the systolic neural network 420 of FIG. 4C with fault tolerance added. A memory 602, which is not an ECC-protected memory, stores input and output matrices and matrix checksum values, the matrices being the matrices used in neural network computations and the matrix checksum values used to detect and correct errors instead of ECC values. Stage 1 604 detects and corrects faults in the input matrices. The input matrices and the checksums row and column of the matrices are prestored in memory 602 as reference checksums. These prestored or reference checksums are retrieved from the memory 602 and are compared against computed checksums of the matrices to check and correct errors. The checksum computation is performed while loading or retrieving the matrices from memory. An error can be found in the matrices or in the checksums and any single error is reliably corrected.

Figure 6A:
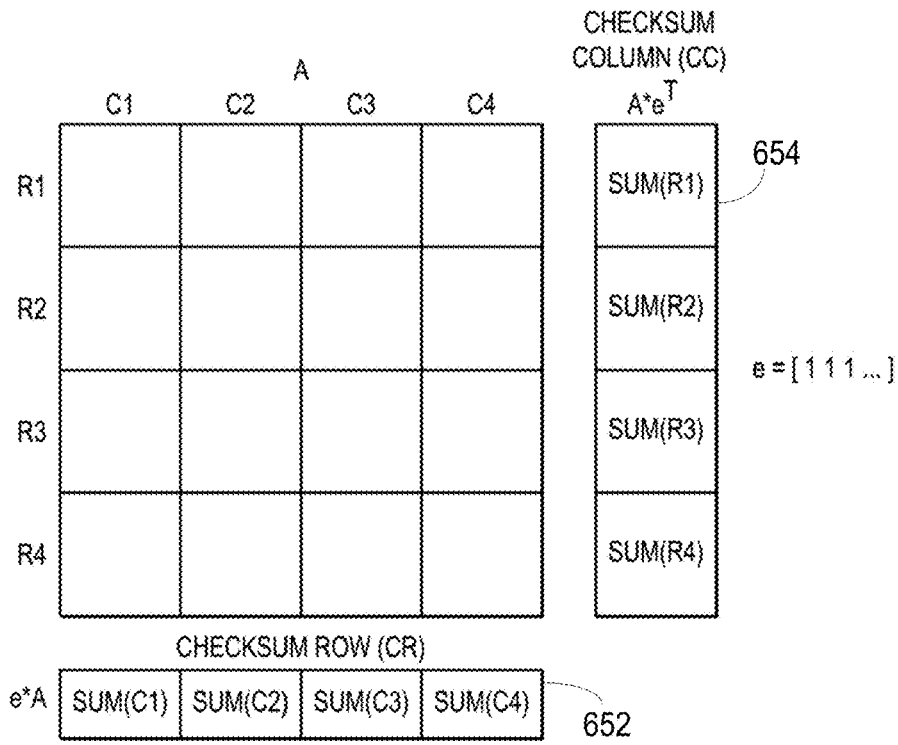
Figure 6B:
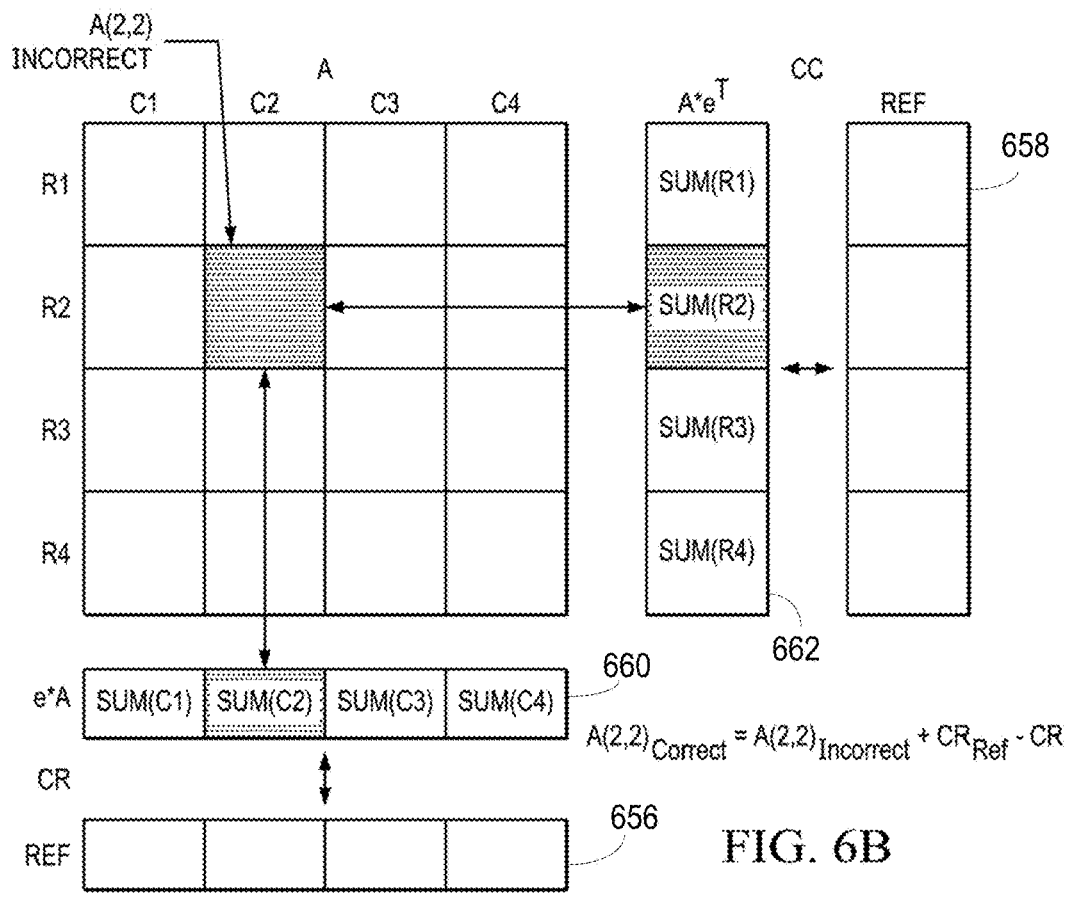
Figures 12G, 12H:
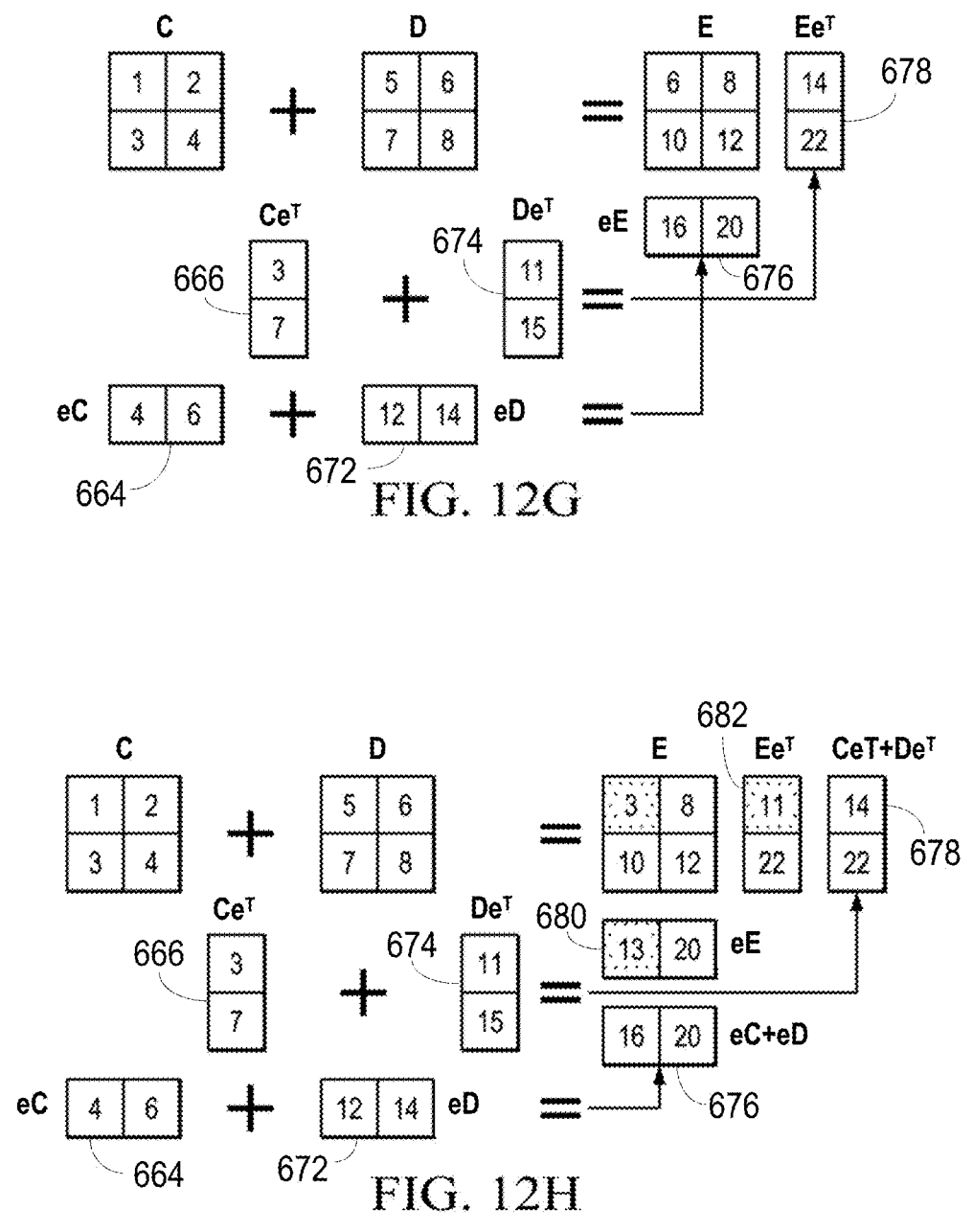

To aid in the understanding of the fault tolerant hardware neural network engine 600, FIGS. 6A to 6F illustrate relevant matrix operations and FIGS. 12A to 12H provide specific examples. FIGS. 6A and 12A illustrate a matrix A and its corresponding checksum row 652 and checksum column 654. The checksum row 652 is a vector with entries for each column in matrix A representing the sum of the elements in the respective column. The checksum column 654 is a vector with entries for each row in matrix A representing the sum of the elements in the respective row. FIGS. 6B and 12B illustrate error detection and correction. The reference checksums $CR_{REF}$ 656 and $CC_{REF}$ 658, such as the checksums stored in the memory 602, are compared to checksums 660 and 662 computed from the matrix retrieved from the memory 602. An error in a matrix cell produces a discrepancy between the reference checksums 656 and 658 and the computed checksums 660 and 662 in the corresponding row and column positions, allowing identification of the cell that needs corrected. If the difference between the computed checksum value and the reference checksum value in both the row and the column are the same, this difference can be used to determine the correct value of the matrix cell by adding the value in the reference checksum (row or column) to the current value of the matrix cell and subtracting the value in the computed checksum (row or column). If only one value in the reference checksum 656 or 658 and the corresponding computed checksum differs, this is an indication of an error in the reference checksum 656 or 658, which is corrected if necessary. In this case, either the computed checksums 660 and 662 or the corrected reference checksums 656 and 658 can be provided to the next stage. Similarly, in the case where the error is in the matrix cell, the matrix cell is corrected but the reference checksums 656 and 658 can be forwarded instead of correcting the computed checksums 660 and 662 and forwarding those corrected computed checksums 660 and 662.

In Stage 1 604, matrices A and B and the related reference checksums 656 and 658 are retrieved from the memory 602 and corrected as necessary. Stage 2 606 performs a matrix operation, such as matrix dot product computation, on the matrices A and B to produce an output matrix, matrix C. Stage 2 606 also detects and corrects faults in the matrix operation. To do so, the reference checksums 656 and 658 or the computed checksums 660 and 662 from stage 1 604, with any errors corrected, are used to compute expected product checksums 664 and 666 of the output matrix C. The expected product checksums 664 and 666 are developed by multiplying a reference checksum 656 or 658 or a computed checksum 660 or 662 of a first matrix (e.g., either matrix A or matrix B) by the other matrix (e.g., the other of matrix A or matrix B) to produce the expected product checksums 664 and 666. The expected product checksums 664 and 666 are compared against a set of computed product checksums 668 and 670 computed directly from the output matrix C to detect and correct errors. Any errors in the dot product operation, and in turn in output matrix C, can be detected based on the comparison and can be corrected in the output matrix C substantially as described above. This correction computation is performed at the output of the matrix multiplication.

FIGS. 6C, 6D and 12C-12F illustrate the expected product checksums computation and the detection of errors. FIG. 6C illustrates the development of the expected product checksums 664 and 666 by performing a dot product of a reference checksum 656 or 658 or a computed checksum 660 or 662 from stage 1 604 for a given matrix (e.g., matrix A or matrix B) and the other matrix, such as the dot product of a checksum row of matrix A and matrix B or the dot product of matrix A and a checksum column of matrix B. FIG. 12C illustrates the reference checksums 656 and 658 or a computed checksum 660 and 662 from stage 1 604, the dot product of the matrices, and the resulting expected product checksums 664 and 666. FIGS. 12D and 12E illustrate the development of the expected product checksums 664 and 666. FIGS. 6D and 12F illustrate the detection and correction of any errors in the output dot product of the matrix by comparing the expected product checksums 664 and 666 with the computed product checksums 668 and 670 computed from output matrix C.

Stage 3 608 performs matrix accumulation on the output of stage 2 604, matrix C. The sum of the output dot product matrix, matrix C, and a prior accumulated matrix, matrix D, is developed as the current accumulated matrix, matrix E. Stage 3 608 also detects and corrects faults in the matrix accumulation. The expected product checksums 664 and 666 or the computed product checksums 668 and 670 of the matrix C are added to checksums 672 and 674 of the prior accumulated matrix D to form expected accumulated checksums 676 and 678 for matrix E. Stage 3 608 also determines a set of computed accumulated checksums 680 and 682 from matrix E. These computed accumulated checksums 680 and 682 are compared against the expected accumulated checksums 676 and 678 and any errors are corrected.

FIGS. 6E, 6F, 12G and 12H illustrate these operations. FIGS. 6E and 12G illustrate the basic development of the expected accumulated checksums 676 and 678 and matrix E. FIGS. 6F and 12H illustrate error detection and correction by comparing the expected accumulated checksums 676 and 678 to the computed accumulated checksums 680 and 682.

Stage 4 bio is a k=3 redundancy triply replicated block which performs the nonlinear activation function. As shown in FIG. 5C, three identical nonlinear activation function blocks receive the corrected accumulated matrix and voting occurs at the output to develop the final output matrix.

Stage 5 612 computes the final checksums of the neural network engine final output matrix while storing the neural network engine final output matrix and the final checksums to memory 602 for use in the next operation.

Figure 7:
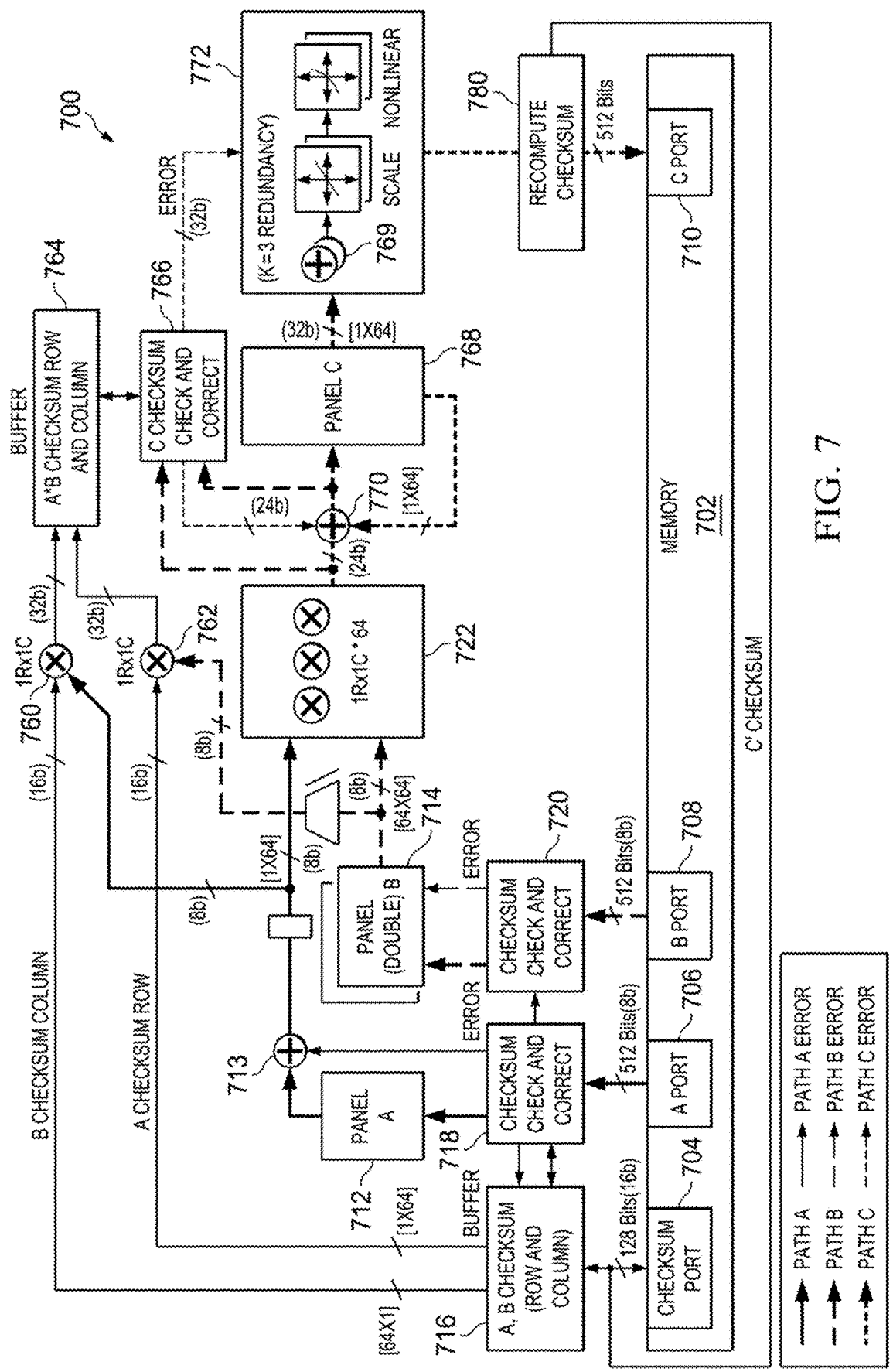
FIG. 7 is a hardware block diagram of the systolic neural network of FIG. 6.

FIG. 7 illustrates one example of a hardware neural network engine 700 to perform the operations of FIG. 6. A memory 702 has four ports, a checksum port 704, an A matrix port 706, a B matrix port 708 and a C matrix port 710. The A matrix port 706 is used to load the A matrix into the neural network engine 700. The B matrix port 708 is used to load the B matrix. The C matrix port 710 is used to store the output matrix to the memory 702. The checksum port 704 is used to load and store the matrix checksums.

To facilitate error correction, in one example an A panel memory 712 is used to hold the entire A matrix before proceeding to the multiplication operation. A dual B panel memory 714 is used to store two copies of the B matrix for ping-pong operation, where the two copies are used for alternating operations. Matrices A and B are first read or retrieved from the memory 702 and loaded into the A and B panel memories 712, 714. The reference checksums are also read from the memory 702 and loaded into an A and B checksum buffer 716. During the matrix read or retrieval operation, the checksums of the A and B matrices are computed in A and B checksum blocks 718, 720. At the end of reading from memory 702, the reference checksums are compared against the computed checksums and any errors in the A or B matrices are detected and the necessary correction computed.

Since there are dual B panel memories 714, an error in the B matrix is immediately corrected by applying the correction in the first B panel while the next B matrix copy is loaded into the second B panel. An error in the A matrix is corrected in the forward path at a corrector 713 when each row of the A matrix is read from the A panel memory 712 for multiplication. The corrector 713 multiplexes the corrected values into the proper locations as the data is passed through. Each row of the previous A matrix is read from the A panel memory 712 into a hardware matrix multiplier 722 while the new A matrix is loaded into the A panel memory 712.

Figure 7A:
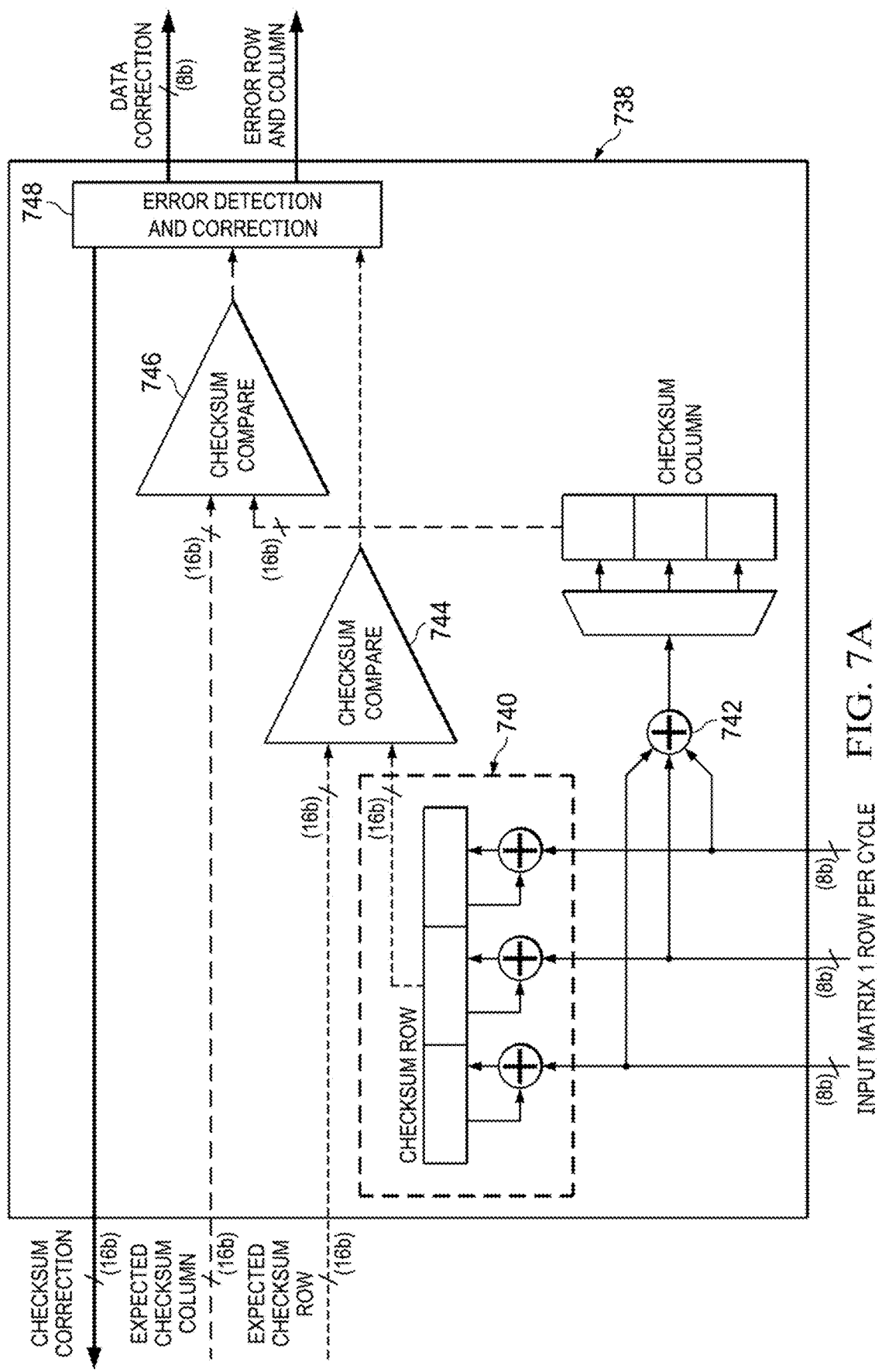
FIG. 7A is a hardware block diagram of the retrieved matrix checksum and correction of FIG. 7.

One example of a checksum computation block 738 used in the checksum blocks 718, 720 to compute errors in the A and B matrices is shown in FIG. 7A. A series of accumulators 740 compute the checksum row. An adder 742 computes one element of a checksum column each cycle. When the B matrix is fully read, the computed checksum column is available. The reference checksums read from the checksum port 704 are also input to the blocks 718, 720. The reference and computed checksums are compared in comparators 744 and 746 and any error is calculated in an error detection block 748. The error can be in the checksums or in the matrices. The error value and location of the error are output from the checksum computation block 738. The checksum computation block 738 in some examples detects and corrects some combination of multiple faults as well as the illustrated single errors.

The hardware matrix multiplier 722 computes one row of the dot product matrix A*B per cycle. Two additional multiplication blocks 760, 762 are used to generate the expected A*B checksums. The checksum row of the A matrix is multiplied with one column of the B matrix every cycle to generate the reference checksum row of A*B, which is stored in a checksums buffer 764. Similarly, the checksum column of the B matrix is multiplied with one row of the A matrix each cycle to generate the reference checksum column of A*B, which is stored in the checksums buffer 764.

Figure 7B:
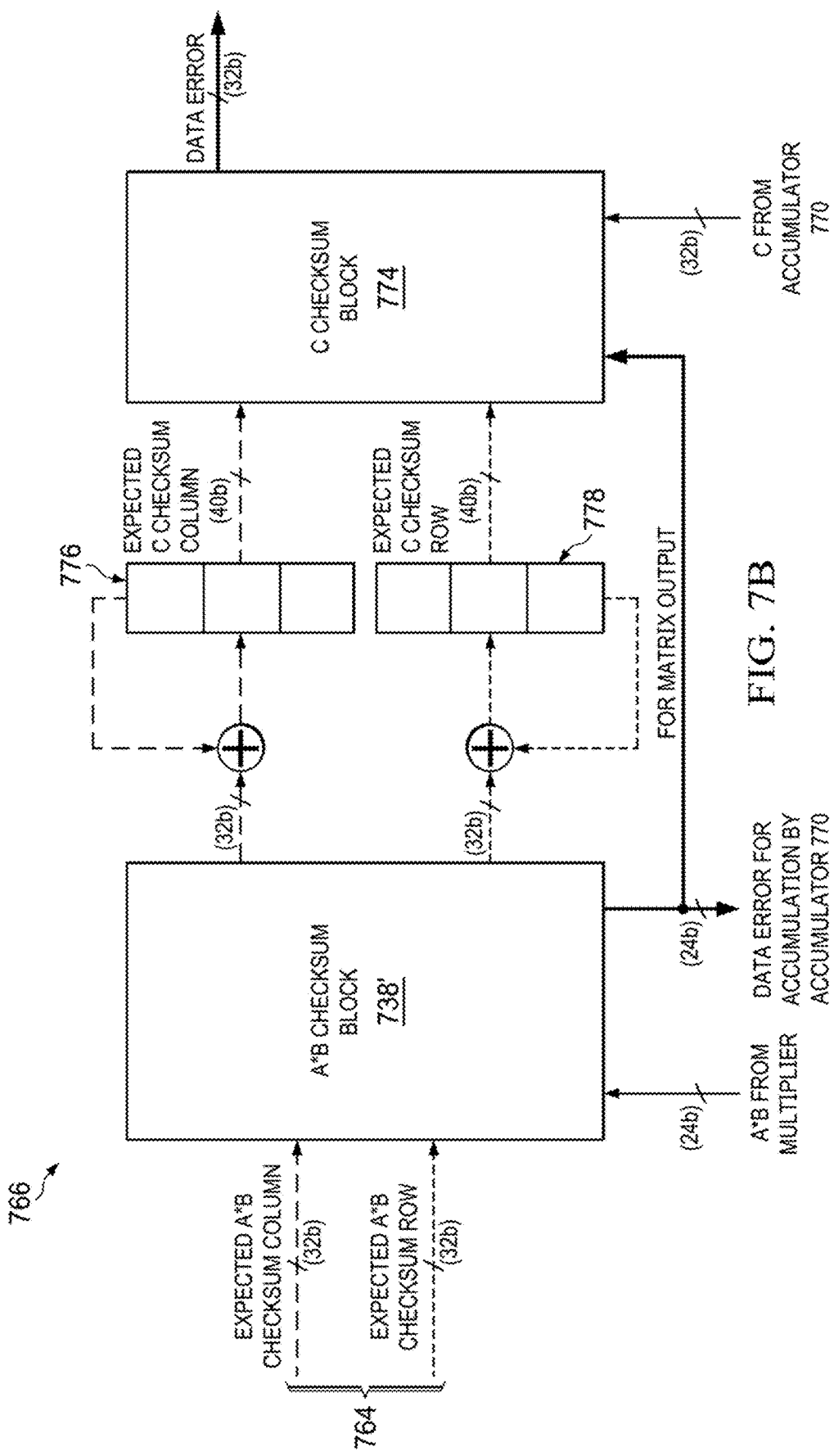
FIG. 7B is a hardware block diagram of the multiplied matrix checksum and correction of FIG. 7.

The output product matrix of the hardware matrix multiplier 722 is passed to accumulator checksum block 766, shown in more detail in FIG. 7B, which includes multiplication checksum computation block 738' before storing or accumulating in C panel memory 768. The multiplication checksum computation block 738' is similar to the A and B checksum computation block 738 with a higher precision.

After a number of cycles, the entire output dot product matrix is available or accumulated in the C panel memory 768. At this point the expected A*B product checksums and the computed A*B product checksums are also available. The expected and computed product checksums are compared by the multiplication checksum computation block 738' and any error in the output product matrix is determined. The correction is applied to the next phase depending on the operation performed.

If the next phase is matrix accumulation, the correction is applied at the time of accumulation at the C panel memory 768, which is done by a hardware matrix accumulator 770. If the next phase is a new matrix multiplication, the correction from the checksum computation block 738' is provided to a C checksum block 774, along with the expected matrix C accumulated checksum column 776 and expected matrix C accumulated checksum row 778, which have been developed by accumulation from the checksum computation block 738'. The output accumulated matrix of the accumulator 770 is also provided to the C checksum block 774. In this manner, when the matrix multiplication is complete, the expected accumulated checksums are compared against computed accumulated checksums for the C matrix accumulated in the C checksum block 774. The error output is provided to a hardware nonlinear matrix block 772, with the correction applied to the output C matrix at a corrector 769 during the read out from the C panel memory 768 to the nonlinear matrix block 772. The corrector 769 multiplexes the corrected values into the proper locations as the data is passed through.

Neural network scaler and nonlinear computational blocks or logic may be triplicated to provide error detection and error correction capability. The inputs to the nonlinear matrix block 772 are the output accumulated matrix of the C panel memory 768 and the error output of the C checksum block 774. Any error is corrected and the corrected received accumulated matrix is operated on in the triplicate computational blocks of the nonlinear matrix block 772.

The output of the nonlinear matrix block 772 is the neural network engine output matrix and is stored in the memory 702 via the C matrix port 710. As the neural network engine output matrix is being stored, a recompute or storage checksum block 780 develops the checksum column and checksum row for the neural network engine output matrix, which are stored in the memory 702 via the checksum port 704, to be used as reference checksums if the neural network engine output matrix is used as an input matrix in a future calculation.

The A, B and C panel memories 714, 712 and 768 are protected by ECC and any storage fault is corrected during readout.

The hardware checksum logic, such as the A and B checksum buffer 716, A and B checksum blocks 718, 720, multiplication blocks 760, 762, checksum computation block 738, checksum computation block 738', checksums buffer 764, and recompute block 780, use the checksums and reference checksum comparisons to obviate the need for triplicated matrix operation processing hardware, except for the nonlinear block. The nonlinear block uses a small amount of silicon area in an SoC, so the trebling of the nonlinear block does not appreciably change the large amount of silicon area savings in an SoC provided by the matrix checksum architecture described above.

The example described above performs correction after the dot product operation. In another example, the errors in the dot product operation are stored and used for correction only after the accumulation operations. In yet another example, an error is not detected for the dot product operation, but the reference checksums are accumulated and used to correct the matrix output after the accumulation operations. In a further example, multiple errors occurring during the dot product and accumulation operations are stored and then correction is performed on the matrix output after the accumulation operations. These various examples provide additional silicon area savings.

Figure 8A:
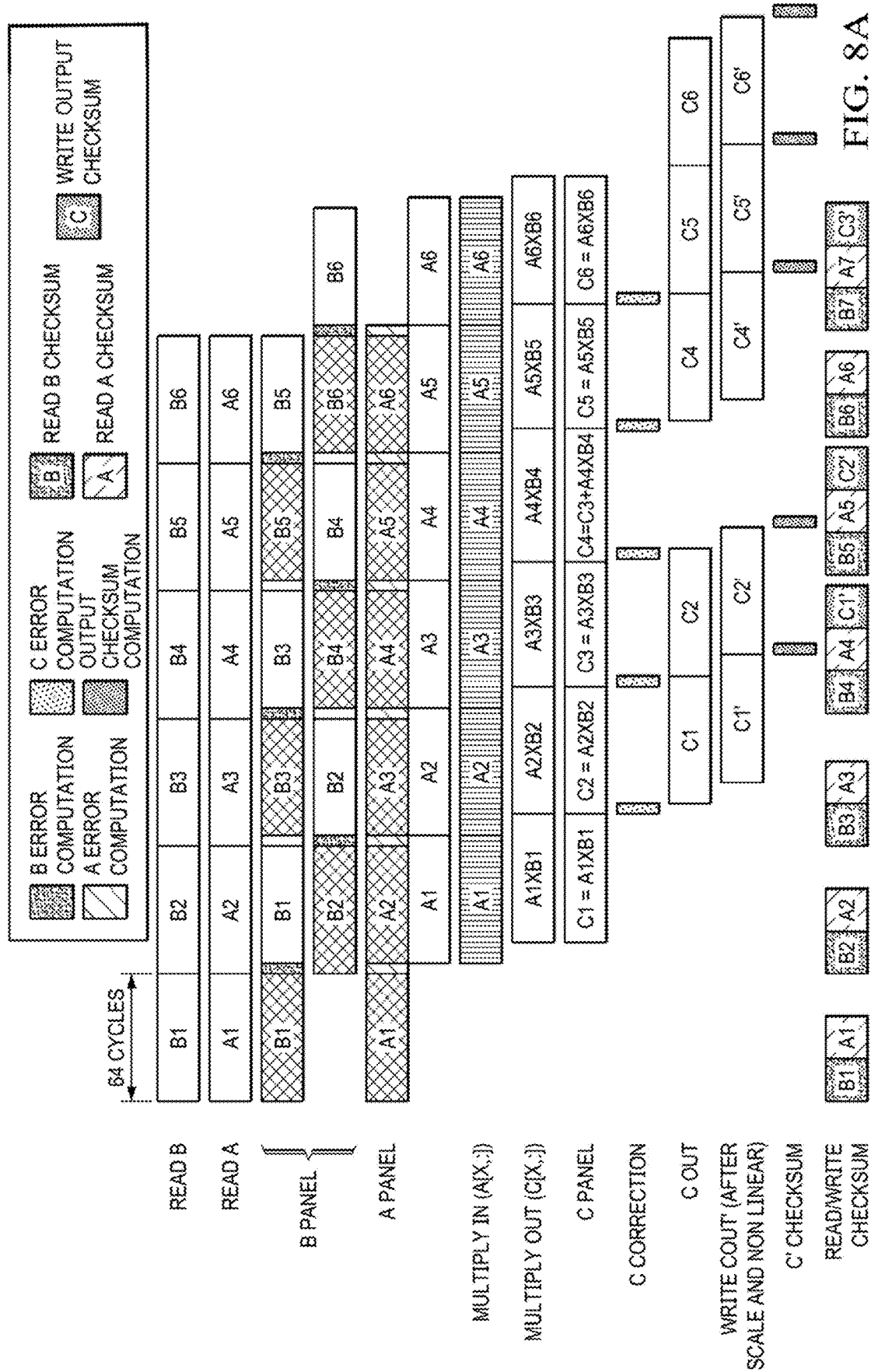
FIG. 8A is a pipeline diagram of the operation of the systolic neural network of FIG. 7.
Figure 8B:
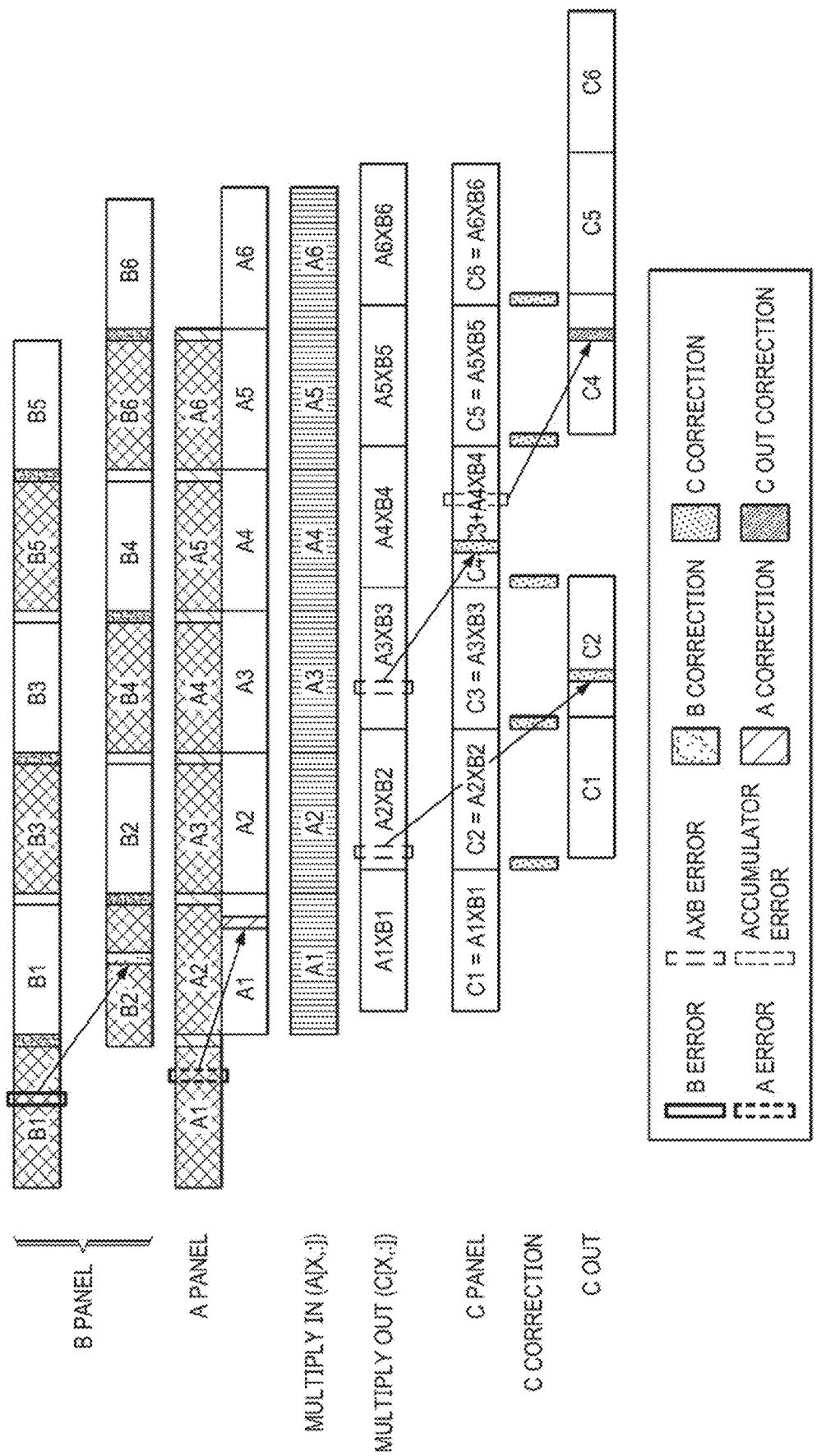
FIG. 8B is the pipeline diagram of FIG. 8A illustrating errors and corrections.

Pipeline diagrams of one example of the neural network engine 700 are shown in FIGS. 8A and 8B. FIGS. 8A and 8B are similar, except FIG. 8B illustrates where errors can occur and when those errors are corrected. Referencing FIGS. 8A and 8B, flowing generally from the upper left to the lower right, the operations from reading the matrices and reference checksums to the matrix multiplication and accumulation and then the nonlinear operation and storage of the final output matrix are illustrated in relationship to each other, with the development of the various checksums and error detection analysis and then correction being illustrated in context.

The throughput of the example of the neural network engine 700 is the same as a neural network engine without provisions for error detection or correction, an engine which would need to be duplicated for fault detection operation or tripled for fault-tolerant operation. The neural network engine 700 performs one matrix multiplication in the same number of cycles. This is possible because the various checksums are computed in parallel with retrieving a matrix or computing a matrix, as shown in FIGS. 8A and 8B, and because corrections are applied in a feedforward manner, as shown in FIG. 8B. For example, as described above, the checksums of the A and B matrices are generated as the A and B matrices are read from the memory and the checksums for the dot product operation are developed at each cycle of the dot product operation. The corrections are made as the data is transferred from one stage to the next. For example, any errors in the A matrix as read from the memory are corrected as the A matrix is provided to the multiplier and any errors in the accumulation or final C matrix are corrected as data is transferred for the next accumulation or to the nonlinear matrix operation. By performing the checksums in this parallel manner and the corrections in feedforward manner, no additional cycles are needed in the operation of the checksum protected neural network engine compared to the neural network without error correction.

However, the latency is higher for the checksum protected neural network engine compared to the neural network without error correction since the input and output matrices need to be corrected. The latency increase from the start of reading the B matrix to the start of the C matrix being available is approximately 64 cycles as compared to the non-corrected version. The latency increase from the start of reading the A matrix to the start of the C matrix being available is approximately 128 cycles as compared to the non-corrected version.

Figure 9:
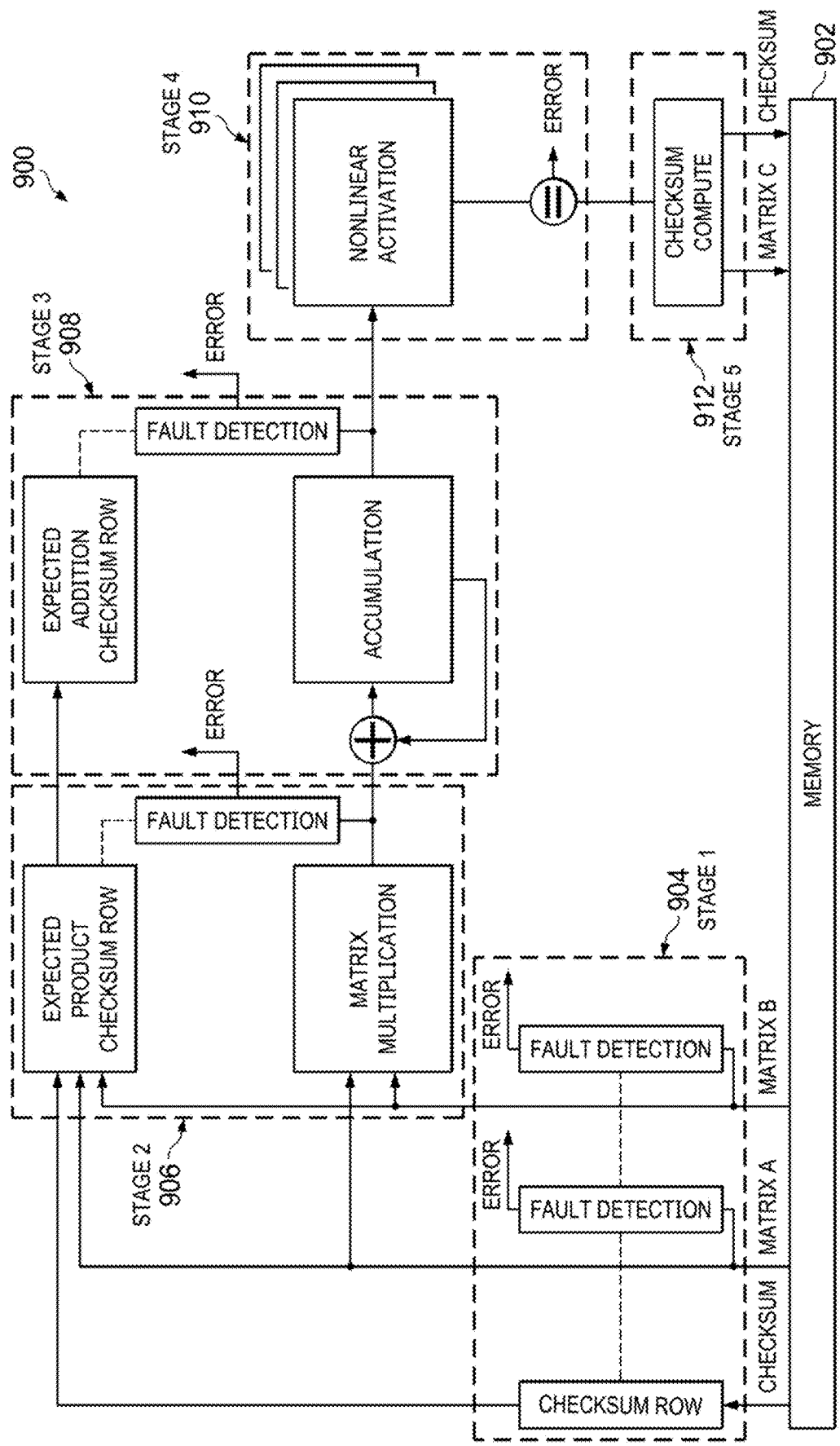
FIG. 9 is a block diagram of a systolic neural network configured for fault detection operation.

ASIL D needs 99% fault detection. Fault correction is not mandatory. Fault detection of the A, B and C matrices can be achieved with a single checksum, either row or column. One example of a simplified version of a neural network engine 900 is shown in FIG. 9. A memory 902 is similar to memory 602. In the neural network engine 900, stage 1 904 produces only checksum rows, used to detect errors or faults in the A and B matrices read from the memory 902 and provides the error or fault indications. Stage 2 906 only develops expected product checksum rows and the output product matrix of the matrix multiplication is only tested for errors or faults and provides the error or fault indications. Stage 3 908 only develops expected addition checksum rows and the accumulated matrix is only tested for errors or faults and provides the error or fault indications. Stage 4 910 is for nonlinear activation and as only protection is needed, the computation blocks are only duplicated. Stage V 912 only develops the checksum row for the output matrix and stores it in the memory 902. Any error or fault indications are provided to the SoC 500 for appropriate response.

The more simplified matrix operations are shown in FIGS. 9A-9C. FIG. 9A illustrates using a checksum row of a first matrix, matrix A, for fault detection within the matrix A by comparing a reference checksum row 952 stored with the matrix A, with a computed checksum row 954 computed when the matrix A is read. Any discrepancy between the reference checksum row 952 and the computed checksum row 954 indicates an error in the matrix A. FIG. 9B illustrates using a checksum row (e.g., reference checksum row 952 or computed checksum row 954) of a first matrix, matrix A, and another matrix, matrix B, to develop an expected product checksum row 956. A matrix operation such as a dot product is performed on matrix A and matrix B to produce matrix C. A computed product checksum row 958 is generated from matrix C and compared to the expected product checksum row 956 for fault detection. FIG. 9C illustrates another example matrix operation, accumulation, where matrix A is added to matrix B to produce matrix C. A checksum row 960 of matrix A is added to a checksum row 962 of matrix B to produce an expected accumulation checksum row 964. A computed accumulation checksum row 966 is generated from matrix C and compared to the expected accumulation checksum row 964 for fault detection.

Figure 10:
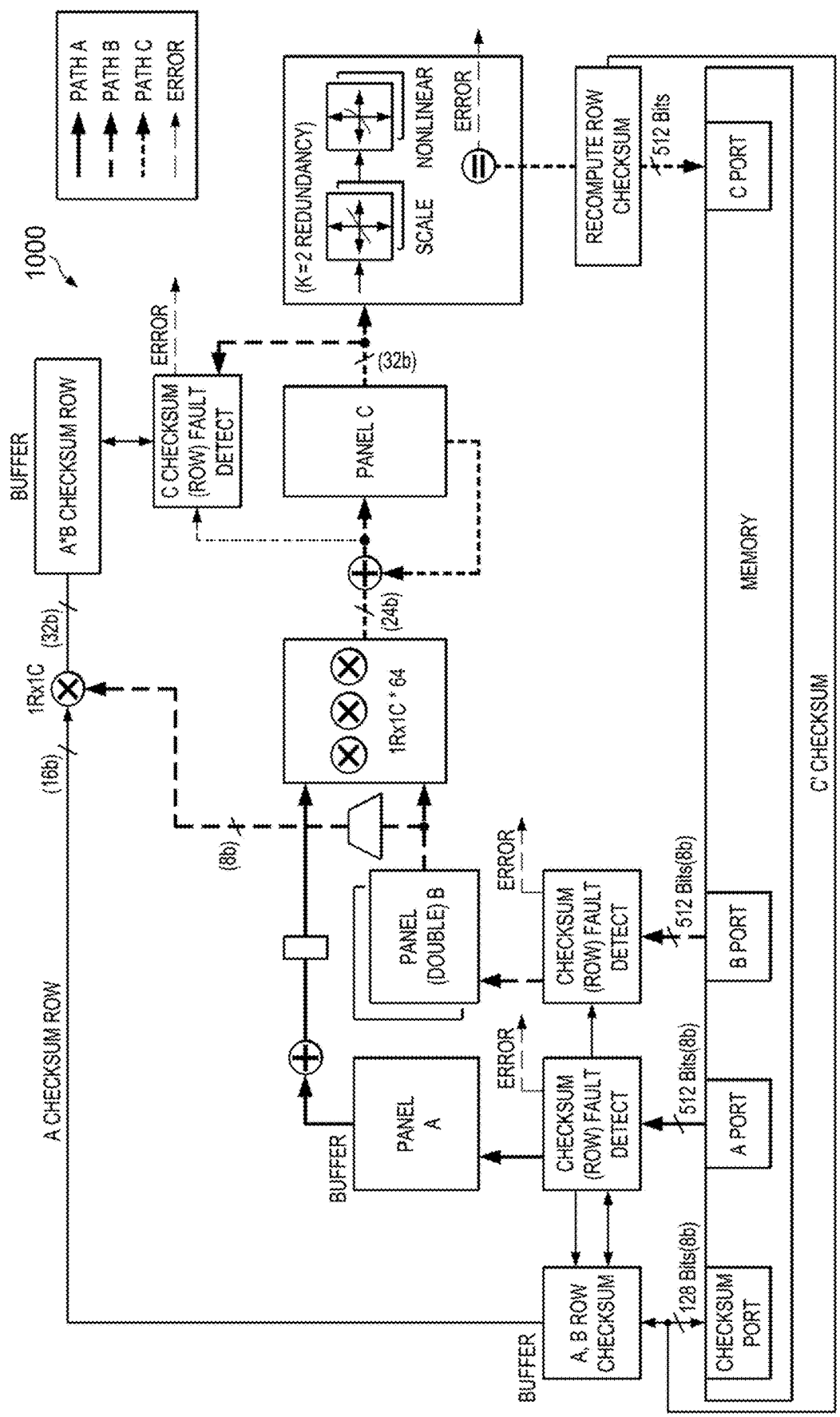
FIG. 10 is a hardware block diagram of the systolic neural network of FIG. 9.

FIG. 10 illustrates one example of a hardware neural network engine 1000 to perform the operations of FIG. 9. In FIG. 10, only checksum rows are used for error detection. However, checksum columns can be used if desired. In that case, the expected product checksum column is obtained by multiplying the A matrix with checksum column of the B matrix. Since correction is not necessary, the correcting logic of FIG. 7 is removed. In addition, the use of the A panel memory 712 is not necessary as any error in the A matrix can be detected at the end of loading or multiplication, so only a simple A buffer is used with the A matrix. In the example of FIG. 10, errors are detected post accumulation.

ECC on the C panel memory is not needed as any error in the C panel memory is detected by placing an error detection block after the C panel memory. ECC on both the A buffer and B panel memory is not necessary. If the checksum column of the A matrix is used, ECC on the A buffer is not necessary. If checksum column of the B matrix is used, ECC in the B panel memory is not necessary. This not needing to use ECC memories and buffers results in area savings of ECC logic and storage. This is because any fault in the A buffer or the B panel memory is detected is an incorrect row in the output checksum. However, ECC of other checksums is still needed.

If only fault detection and not fault correction is required, the checksum technique still provides a large savings in silicon area of an SoC as compared to having duplicate conventional neural network engines operating in lockstep.

Figure 11:
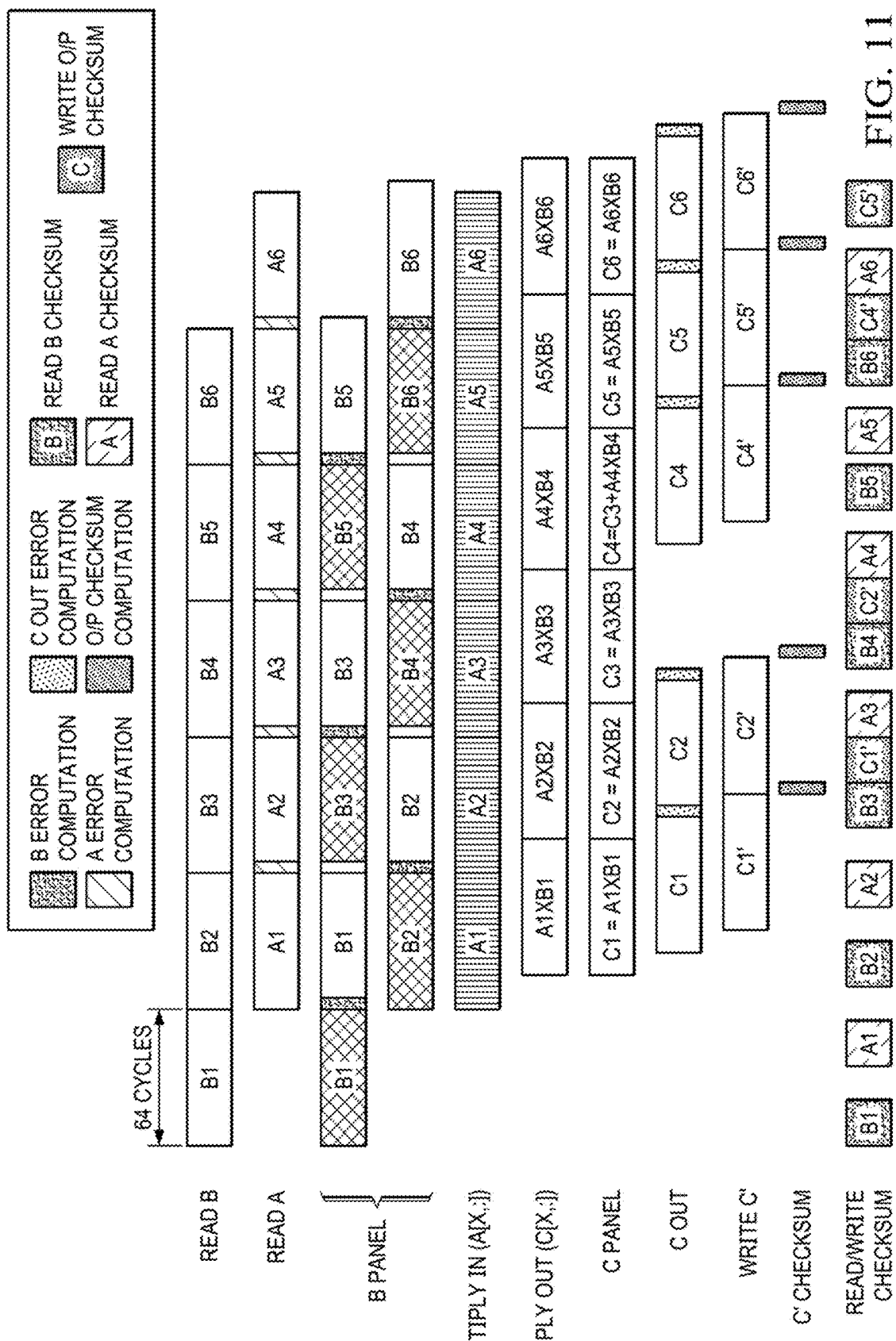
FIG. 11 is a pipeline diagram of the operation of the systolic neural network of FIG. 9.

The pipeline diagram of FIG. 11 of the hardware neural network engine 1000 is similar in latency to that of the neural network engine with no fault detection or correction. As with the pipeline diagram of FIG. 8A, the relationships between the various operations and error detection are shown.

The above description is intended to be illustrative, and not restrictive. For example, the above-described examples may be used in combination with each other. Many other examples will be apparent upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A hardware neural network engine comprising:
a memory for storing matrices used in neural network computations and developed by neural network computations and storing checksums of the stored matrices;
a hardware matrix multiplier coupled to the memory for performing a dot product operation on input matrices that are retrieved from the memory and providing an output product matrix;
a hardware matrix accumulator coupled to the matrix multiplier for receiving the output product matrix, accumulating the output product matrix and providing an accumulated matrix;
a hardware nonlinear matrix block coupled to the matrix accumulator and the memory for receiving the accumulated matrix, performing nonlinear neural network computations on the received accumulated matrix and providing a neural network engine output matrix for storing in the memory; and
hardware checksum logic coupled to the memory, the matrix multiplier, the matrix accumulator and the nonlinear matrix block for utilizing matrix checksums to detect faults in the operations of matrix retrieval from memory, matrix multiplication and matrix accumulation,
wherein the hardware nonlinear matrix block includes replicated logic to detect faults in the operation of the nonlinear matrix block.

2. The hardware neural network engine of claim 1, wherein the hardware checksum logic includes comparison logic to compute a checksum for a matrix retrieved from the memory, to compare the computed checksum with a reference checksum retrieved from the memory and to provide an error indication if the computed checksum and the reference checksum do not match.

3. The hardware neural network engine of claim 1, wherein the hardware checksum logic includes multiplication checksum logic to develop an expected product checksum by multiplying a checksum for a first matrix retrieved from the memory with a second matrix retrieved from the memory, to develop a computed product checksum from the output product matrix, to compare the expected product checksum and the computed product checksum and to provide an error indication if the expected product checksum and the computed product checksum do not match.

4. The hardware neural network engine of claim 1, wherein the hardware checksum logic includes accumulator checksum logic to develop an expected accumulated checksum by adding a checksum for the output product matrix and a checksum for a previous accumulated matrix, to develop a computed accumulated checksum from a current accumulated matrix, to compare the expected accumulated checksum and the computed accumulated checksum and to provide an error indication if the expected accumulated checksum and the computed accumulated checksum do not match.

5. The hardware neural network engine of claim 1, wherein the hardware checksum logic includes storage checksum logic to develop a final checksum from the neural network engine output matrix and to store the final checksum in the memory.

6. The hardware neural network engine of claim 1, wherein the hardware checksum logic further utilizes matrix checksums to correct faults in any of the operations of matrix retrieval from memory, matrix multiplication and matrix accumulation.

7. The hardware neural network engine of claim 6, wherein the hardware checksum logic includes retrieval correction logic to compute checksums for a matrix retrieved from the memory, to compare the computed checksums with reference checksums retrieved from the memory and to correct an error in the checksums or the retrieved matrix if the computed checksums and the reference checksums do not match.

8. The hardware neural network engine of claim 6, wherein the hardware checksum logic includes multiplication checksum logic to develop expected product checksums by multiplying a first checksum for a first matrix retrieved from the memory with a second matrix retrieved from the memory and by multiplying a second checksum for the second matrix with the first matrix, to develop computed product checksums from the output product matrix, to compare the expected product checksums and the computed product checksums and to correct an error in the computed product checksums or the output product matrix if the expected product checksums and the computed product checksums do not match.

9. The hardware neural network engine of claim 6, wherein the hardware checksum logic includes accumulator checksum logic to develop expected accumulated checksums by adding checksums for the output product matrix and checksums for a previous accumulated matrix, to develop computed accumulated checksums from a current accumulated matrix, to compare the expected accumulated checksums and the computed accumulated checksums and to correct an error in the computed accumulated checksums or the current accumulated matrix if the expected accumulated checksums and the computed accumulated checksums do not match.

10. The hardware neural network engine of claim 6, wherein the hardware checksum logic includes storage checksum logic to develop final checksums from the neural network engine output matrix and to store the final checksums in the memory.

11. A system on a chip (SoC) comprising:
a plurality of processors;
a memory controller coupled to the plurality of processors;
onboard memory coupled to the memory controller;
a high-speed interconnect coupled to the plurality of processors and the memory controller;
an external communication interface coupled to the high-speed interconnect; and
a hardware neural network engine coupled to the high-speed interconnect, the hardware neural network engine comprising:
a memory for storing matrices used in neural network computations and developed by neural network computations and storing checksums of the stored matrices;
a hardware matrix multiplier coupled to the memory for performing a dot product operation on input matrices that are retrieved from the memory and providing an output product matrix;
a hardware matrix accumulator coupled to the matrix multiplier for receiving the output product matrix, accumulating the output product matrix and providing an accumulated matrix;
a hardware nonlinear matrix block coupled to the matrix accumulator and the memory for receiving the accumulated matrix, performing nonlinear neural network computations on the received accumulated matrix and providing a neural network engine output matrix for storing in the memory; and
hardware checksum logic coupled to the memory, the matrix multiplier, the matrix accumulator and the nonlinear matrix block for utilizing matrix checksums to detect faults in the operations of matrix retrieval from memory, matrix multiplication and matrix accumulation,
wherein the hardware nonlinear matrix block includes replicated logic to detect faults in the operation of the nonlinear matrix block.

12. The SoC of claim 11, wherein the hardware checksum logic includes comparison logic to compute a checksum for a matrix retrieved from the memory, to compare the computed checksum with a reference checksum retrieved from the memory and to provide an error indication if the computed checksum and the reference checksum do not match.

13. The SoC of claim 11, wherein the hardware checksum logic includes multiplication checksum logic to develop an expected product checksum by multiplying a checksum for a first matrix retrieved from the memory with a second matrix retrieved from the memory, to develop a computed product checksum from the output product matrix, to compare the expected product checksum and the computed product checksum and to provide an error indication if the expected product checksum and the computed product checksum do not match.

14. The SoC of claim 11, wherein the hardware checksum logic includes accumulator checksum logic to develop an expected accumulated checksum by adding a checksum for the output product matrix and a checksum for a previous accumulated matrix, to develop a computed accumulated checksum from a current accumulated matrix, to compare the expected accumulated checksum and the computed accumulated checksum and to provide an error indication if the expected accumulated checksum and the computed accumulated checksum do not match.

15. The SoC of claim 11, wherein the hardware checksum logic includes storage checksum logic to develop a final checksum from the neural network engine output matrix and to store the final checksum in the memory.

16. The SoC of claim 11, wherein the hardware checksum logic further utilizes matrix checksums to correct faults in any of the operations of matrix retrieval from memory, matrix multiplication and matrix accumulation.

17. The SoC of claim 16, wherein the hardware checksum logic includes retrieval correction logic to compute checksums for a matrix retrieved from the memory, to compare the computed checksums with reference checksums retrieved from the memory and to correct an error in the checksums or the retrieved matrix if the computed checksums and the reference checksums do not match.

18. The SoC of claim 16, wherein the hardware checksum logic includes multiplication checksum logic to develop expected product checksums by multiplying a first checksum for a first matrix retrieved from the memory with a second matrix retrieved from the memory and by multiplying a second checksum for the second matrix with the first matrix, to develop computed product checksums from the output product matrix, to compare the expected product checksums and the computed product checksums and to correct an error in the computed product checksums or the output product matrix if the expected product checksums and the computed product checksums do not match.

19. The SoC of claim 16, wherein the hardware checksum logic includes accumulator checksum logic to develop expected accumulated checksums by adding checksums for the output product matrix and checksums for a previous accumulated matrix, to develop computed accumulated checksums from a current accumulated matrix, to compare the expected accumulated checksums and the computed accumulated checksums and to correct an error in the computed accumulated checksums or the current accumulated matrix if the expected accumulated checksums and the computed accumulated checksums do not match.

20. A device comprising:
a memory;
a first stage coupled to the memory and configured to:
retrieve, from the memory, a first matrix and a reference checksum corresponding to the first matrix, calculate a computed checksum for the first matrix, and compare the reference checksum to the computed checksum;
a second stage coupled to the first stage and configured to:
perform first operations on the first matrix, the reference checksum and a second matrix to produce a third matrix, first and second expected checksums corresponding to the third matrix and first and second computed checksums corresponding to the third matrix; and
perform second operations to compare the first expected checksum to the first outputted checksum and compare the second expected checksum to the second computed checksum;
a third stage coupled to the second stage and configured to:
perform a third operation on the third matrix and an accumulated matrix to produce a fourth matrix;
form third and fourth expected checksums corresponding to the fourth matrix,
calculate third and fourth computed checksums corresponding to the fourth matrix; and compare the third expected checksum to the third computed checksum and compare the fourth expected checksum to the fourth computed checksum.

* * * * *